United States Patent
Lane et al.

(10) Patent No.: US 6,502,044 B1
(45) Date of Patent: Dec. 31, 2002

(54) SELF-DIAGNOSTIC CIRCUITRY FOR EMERGENCY LIGHTING FIXTURES

(75) Inventors: John Evan Lane, Norcross, GA (US); Richard C. Farthing, London (GB)

(73) Assignee: Acuity Brands Inc., Atlanta, GA (US)

( * ) Notice: Subject to any disclaimer, the term of this patent is extended or adjusted under 35 U.S.C. 154(b) by 0 days.

(21) Appl. No.: 09/352,184

(22) Filed: Jul. 12, 1999

(51) Int. Cl.[7] .......................... G01R 31/36; G06F 19/00
(52) U.S. Cl. ........................................ 702/63; 363/101
(58) Field of Search ........................... 702/60, 63, 82, 702/108, 183; 340/333, 693.1, 693.2, 3.1, 693.3–693.4; 315/86; 363/101

(56) References Cited

U.S. PATENT DOCUMENTS

| | | | |
|---|---|---|---|
| 4,167,680 A | * 9/1979 | Gross | 307/66 |
| 4,544,910 A | * 10/1985 | Hoberman | 340/333 |
| 4,799,039 A | 1/1989 | Balcom et al. | |
| 4,945,280 A | 7/1990 | Beghelli | |
| 5,154,504 A | * 10/1992 | Helal et al. | 362/20 |
| 5,574,423 A | * 11/1996 | Vosika et al. | 340/333 |
| 5,646,502 A | * 7/1997 | Johnson | 307/66 |
| 5,666,029 A | * 9/1997 | McDonald | 315/86 |
| 5,734,230 A | * 3/1998 | Edwards et al. | 315/86 |
| 5,739,639 A | * 4/1998 | Johnson | 315/86 |
| 5,811,938 A | * 9/1998 | Rodriguez | 315/86 |
| 5,811,975 A | * 9/1998 | Bernardo | 324/414 |
| 6,069,801 A | * 5/2000 | Hodge, Jr. et al. | 363/21.02 |
| 6,072,283 A | * 6/2000 | Hedrei et al. | 315/307 |
| 6,111,368 A | * 8/2000 | Luchaco | 315/307 |
| 6,255,804 B1 | * 7/2001 | Herniter et al. | 320/137 |
| 6,259,215 B1 | * 7/2001 | Roman | 315/307 |

* cited by examiner

Primary Examiner—John S. Hilten
Assistant Examiner—Demetrius Pretlow
(74) Attorney, Agent, or Firm—Kenneth E. Darnell

(57) ABSTRACT

Electronic self-test and/or self-diagnostic systems particularly useful with emergency lighting fixtures, including exit signage having light emitting diodes as light sources and unit emergency fixtures powered with lead-acid batteries, the systems perform testing and diagnostic functions on the circuitry, power supply, charger and lamping of such fixtures either by manual or automatic initiation. Testing functions are provided through use of a programmable microprocessor, the diagnostic circuitry not only monitoring operation of charger/transfer circuitry but also controlling the charger/transfer circuitry to enable alternate strategies for alleviation of a given failure. In emergency mode of a light emitting diode exit sign, a microprocessor-controlled two-stage inverter is employed not only to power the LED light source, but also to efficiently power the microprocessor. Power to the microprocessor is controlled by the microprocessor itself and can therefore be discontinued after appropriate operation until mains power is restored, thereby effectively reducing power consumption to zero. System operation can be flexibly configured through use of a two-wire serial link between modular elements of the system. Incandescent emergency unit fixtures due to high drain rates and output loads require emergency mode operation through use of lead-acid batteries, thereby requiring voltage controlled charging and relay transfer, the self-test and/or self-diagnostic circuitry of the invention used with emergency unit fixtures thus differing in various respects from the circuitry employed for the LED exit signage fixtures and primarily in the need to measure both charge and discharge currents, the circuitry having a larger dynamic range in addition to a capability of measuring both positive and negative currents.

28 Claims, 10 Drawing Sheets

SELF-DIAGNOSTIC CIRCUITRY FOR EMERGENCY LIGHTING FIXTURES

BACKGROUND OF THE INVENTION

1. Field of the Invention

The invention relates generally to emergency lighting systems normally operable from a mains power supply and configured to operate from an emergency power source on failure of mains power, the invention particularly relating to programmable self-test and/or self-diagnostic systems for emergency lighting fixtures and which are capable of manual or automatic performance of testing and diagnostic functions on the circuitry, power supply, charging system and lamping thereof.

2. Description of the Prior Art

Emergency lighting systems have become ubiquitous due to code requirements, power typically being provided to emergency lighting systems under normal operating conditions by mains power supplied both to a normal AC ballast for light generation and to an emergency ballast for maintaining a charge on a power supply typically carried by the emergency lighting system, the power supply usually taking the form of an internal battery. Loss of line voltage results in the switching of the emergency ballast to power the lamping of the emergency lighting system through the emergency power supply, power being typically provided to the lamping for operation of the emergency lighting system for a relatively short period of time. Since the emergency lighting system is effectively in stand-by mode during normal operation thereof, periodic testing of the system is desirable in order to ensure proper functioning during emergency conditions, that is, loss of mains power. Conventionally, emergency lighting systems are tested by the active intervention of building maintenance personnel by manual operation of a test switch to simulate a power outage and to monitor the operation of the emergency lighting system. Neglect of testing procedures often occurs and results in detection of the failure of the emergency lighting system only when an emergency situation arises. In relatively recent years, automatic self-test and/or diagnostic circuitry for emergency lighting systems has become available. In such circuitry, an internal control system such as a microprocessor automatically causes a number of different tests to be conducted in sequence, such tests including detection of lamp current flow, power transfer from charger to battery and battery voltage. Failure conditions are typically indicated in such circuitry through illumination of a visual indicator such as a light emitting diode to indicate that maintenance is required. Systems monitored at central locations would also produce an indication of test failure on a computer display terminal at a central monitoring location. Systems capable of automatic testing include the supervisory emergency lighting system disclosed by Balcom et al in U.S. Pat. No. 4,799,039, this patent also describing other emergency lighting systems having periodic testing and self-diagnostic capabilities. The supervisory system of Balcom et al continuously monitors selected parameters of an emergency lighting system and periodically tests the system under simulated full-load emergency conditions automatically. The Balcom et al system also includes a closed loop three-mode battery charging control circuit. Vosika et al, in U.S. Pat. No. 5,574,423, disclose a self-diagnostic circuit for an emergency lamp which includes a high-impedance circuit path connected in series with the lamp and including a visual indicator energized by battery current passing through the circuit path and lamp during standby mode operation. A second high impedance circuit path is connected in parallel with the lamp to energize a second visual indicator whenever proper electrical continuity does not exist through the lamp. In U.S. Pat. No. 5,666,029, McDonald automatically tests the emergency ballast of an emergency lighting system, testing functions being facilitated by providing the emergency ballast with a transistorized inverter cutoff unit.

While circuitry of the prior art provides improved testing and diagnosis of emergency lighting systems when compared to manual testing as has been standard in the art for many years, the art is improved by the present invention which provides a low power, low cost circuit board combining all functions of a self-test/self-diagnostic system with control of all diagnostic, charging and transfer functions through the use of software, a microprocessor so controlled not only monitoring operation of charger/transfer circuitry but also controlling the charger/transfer circuitry to enable alternate strategies for alleviation of a given failure. The present self-test and self-diagnostic circuitry is thus capable of optimal function at extraordinarily low cost, the present system thereby producing a valuable advance in the art.

SUMMARY OF THE INVENTION

The invention provides an emergency lighting fixture having both manual and automatic self-test/self-diagnostic capabilities and wherein all diagnostic, charging and transfer functions are controlled by a microprocessor operating with software instructions. Microprocessor control is accomplished without modification of standard charger, inverter and lamp topology such as are conventionally employed in emergency lighting systems now available in the marketplace. The present electronic self-test and/or self-diagnostic circuitry combines with an emergency lighting system to perform under manual or automatic control testing and diagnostic functions on the circuitry, power supply, charger and lamping of a fixture. The diagnostic circuitry of the invention not only monitors operation of charger/transfer circuitry but also controls such circuitry to enable implementation of alternate strategies for alleviation of a given failure. In an LED exit sign, for example, a two-stage inverter powers the light emitting diodes and is controlled by the microprocessor, the microprocessor being efficiently powered in inverter mode. Further, battery power supply to the microprocessor is controlled by the microprocessor and is discontinued after appropriate operation until primary power is restored. Configuration of the test and diagnostic system in an exit signage embodiment can occur through use of a two-wire serial link between modular elements of the system, allowing the system to be flexibly configured in a low power low cost circuit board, flexibility further being provided by separate treatment of lamping from charger and diagnostic electronics.

In the LED exit signage mode, the present diagnostic circuitry employs the two-stage inverter indicated herein as being controlled by a microprocessor to convert voltage from one or more cells to a higher voltage for driving a string of light emitting diodes such as form the lamping of the exit sign or the like, driving of the light emitting diodes being accomplished in a manner similar to that described in U.S. Pat. No. 5,739,639, the disclosure of which is incorporated hereinto by reference. An EEPROM memory is used in this embodiment of the present system to set factory determined configuration parameters, thereby allowing accurate calibration without the need to use unreliable and costly potentiometers and further providing a field diagnostic log containing information relating to testing and diagnostic history.

The LED exit signage embodiment of the present system further utilizes all solid state transfer switches for switching between emergency charging and diagnostic modes, this embodiment of the invention not utilizing relays and therefore using less power with more reliability than prior systems so configured. Since the microprocessor used according to the invention controls its own power supply and turns itself off once battery voltage has reached a low voltage disconnect threshold, very low power is consumed once the required emergency discharge is complete, a further benefit which allows the system to be shipped in this first embodiment without disconnecting the battery. Emergency lighting fixtures configured according to this first embodiment of the invention therefore do not require connection of the battery on site during installation, thereby reducing on-site installation time and possible error. System flexibility in the LED exit sign embodiment of the invention is maximized through use of a two-wire serial data interface providing linkage between elements of the system which can be modular in nature and include optional circuit boards to allow optional features to be readily added to the lighting system. Software controlling the microprocessor of the invention in the LED exit sign embodiment of the invention, drives a low cost battery maintenance algorithm through use of a simple shunt circuit to reduce battery trickle charge current once the battery is charged, battery life thus being prolonged.

A second embodiment of the invention capable of self-test and/or self-diagnosis of emergency unit lighting fixtures is necessitated by differences in the basic load and battery chemistries which exist between normally incandescent emergency unit fixtures and emergency exit signage illuminated by an array of light emitting diodes. While the first embodiment of the invention finds primary use with exit signage illuminated by light emitting diodes, the second embodiment of the invention is used in emergency unit fixtures wherein sealed lead-acid batteries are normally used to provide power for direct current lamps when AC mains power fails. Typical drain rates in the emergency mode of operation in such emergency unit fixtures range from three to thirty amps depending upon the number of direct current lamps operated within the unit fixture. By comparison, battery drain rates required from an efficient light emitting diode exit sign is less than approximately 650 milligrams. Accordingly, LED exit signs can be operated in the emergency mode by one or more NiCd batteries using a relatively simple current control charger. The use of lead-acid batteries in emergency unit fixtures requires use of a voltage-control charger in order to maintain the batteries properly in the normal, non-emergency mode of operation. The need for sealed lead-acid batteries in emergency unit fixtures is accompanied by the need for temperature compensation of charger output voltage in order to maximize battery life over a range of operating temperatures.

As a second consideration for the need for the two embodiments of the invention, a large difference exists in output mode requirements between emergency exit signage and unit emergency fixtures. In the situation involving an exit sign illuminated by light emitting diodes, in particular, the load is small enough to be driven with a small boost converter circuit having a battery-drain rate of less than 650 milliamps. In emergency unit fixtures utilizing incandescent lamping in the emergency mode, output load of greater than three amps necessitate use of a relatively simple relay transfer circuit for the output load. A further complication of the increased output load in emergency unit fixtures dictates that diagnostic circuitry for unit fixtures requires a more complicated current sense circuit as opposed to a relatively simple shunt element, that is, a resistor, as is used in the exit sign which is capable of functioning with the first embodiment of the circuitry of the invention. The self-diagnostic aspect of the second embodiment of the invention requires the diagnostic circuitry to measure both charge and discharge currents, such diagnostic circuitry therefore requiring a large dynamic range and being capable of measuring both positive and negative currents.

The second embodiment of the invention which is particularly useful with emergency unit fixtures having incandescent lamping is capable of operation without the use of an inverter. Further, the second embodiment of the invention does not provide a zero power consumption feature as occurs with the first embodiment of the invention, it being necessary to ship emergency unit fixtures so configured with the battery disconnected. Still further, the emergency unit fixtures having the second embodiment of the diagnostic circuitry forming a portion thereof utilizes a relay to connect direct current lamps to lead-acid batteries during emergency mode operation. A relay can preferably be used when the system is configured with lead-acid batteries. The battery-charging algorithm used in the emergency unit fixture is also more complex than the algorithm employed in the first embodiment of the invention which is used with LED emergency exit signage. The more complex algorithm is necessary due to the differing charger topology, the emergency unit fixtures requiring a voltage-control charger while the LED exit signs utilize a relatively current-control charger using a shunt regulation topology.

Accordingly, it is an object of the invention to provide electronic self-test and/or self-diagnostic systems particularly useful with emergency lighting fixtures, the systems performing testing and diagnostic functions on the circuitry, power supply, charger and lamping of a fixture either by manual or automatic initiation.

It is another object of the invention to provide diagnostic circuitry for emergency lighting systems which not only monitor operation of charger/transfer circuitry but also control the charger/transfer circuitry to enable implementation of alternate strategies for alleviation of a given failure.

It is a further object of the invention to provide self-test/self-diagnostic emergency lighting fixtures configured in a low power, low cost circuit board with control of all diagnostic, charging and transfer functions by means of software, the system including a standard charger, an inverter or relay and standard lamp topology.

It is a still further object of the invention to provide in a first embodiment of self-test/self-diagnostic emergency lighting fixtures an inverter controlled by a microprocessor and converting voltage from one or more cells to a higher voltage to drive lamping such as a light emitting diode array as in an exit sign, inverter operation being fully microprocessor controlled.

It is yet another object of the invention to provide in a second embodiment of self-test/self-diagnostic emergency lighting fixtures a relay transfer circuit controlled by a microprocessor and a voltage-controlled charger for operation of emergency unit fixtures utilizing incandescent lamping, operation of the fixtures being microprocessor controlled.

Further objects and advantages of the invention will become more readily apparent in light of the following detailed description of the preferred embodiments.

DESCRIPTION OF THE PREFERRED EMBODIMENTS.

Figure 1:
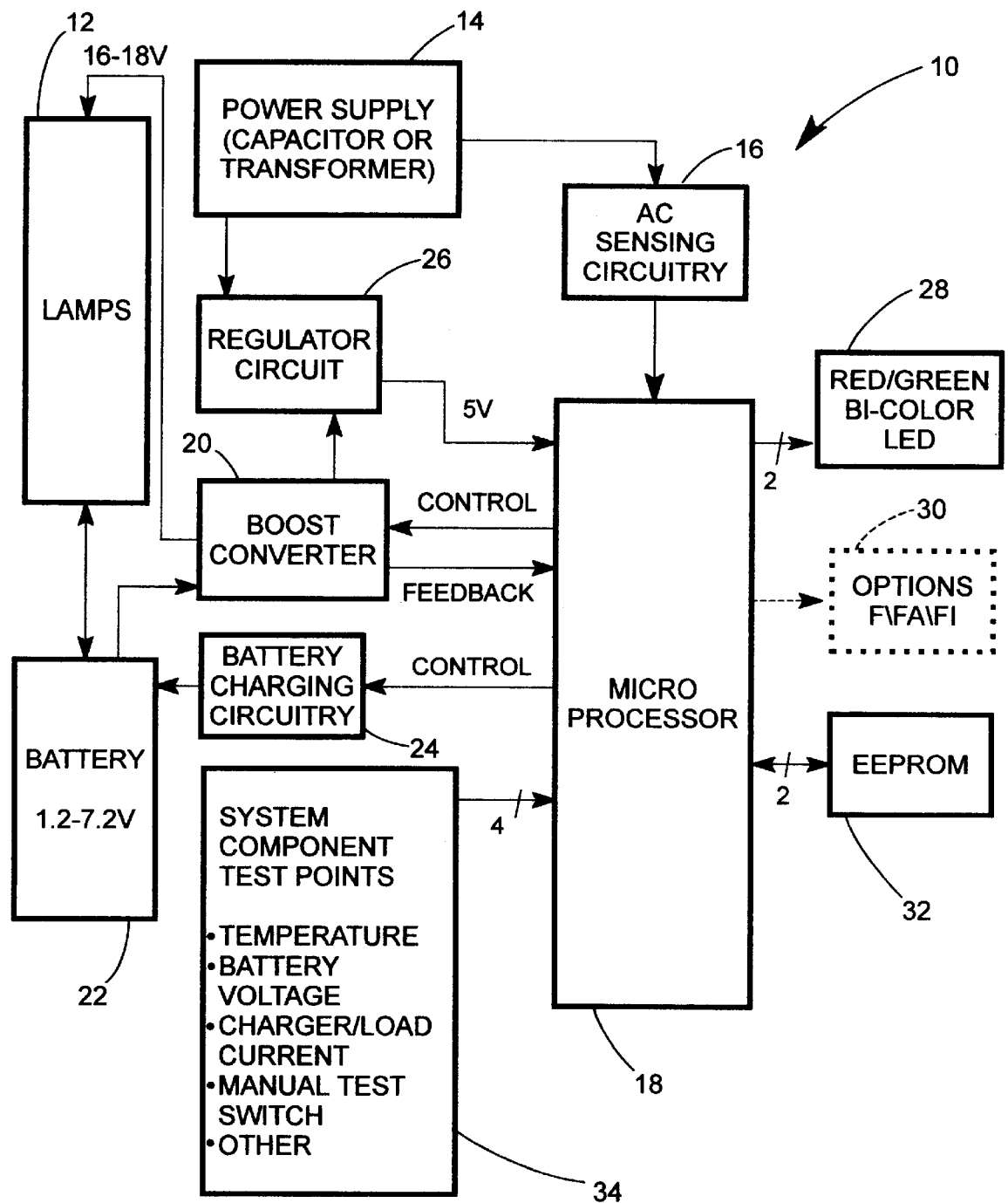
FIG. 1 is a block diagram of a first embodiment of the emergency lighting system of the invention including self-test/self-diagnostic circuitry.
Figure 2:
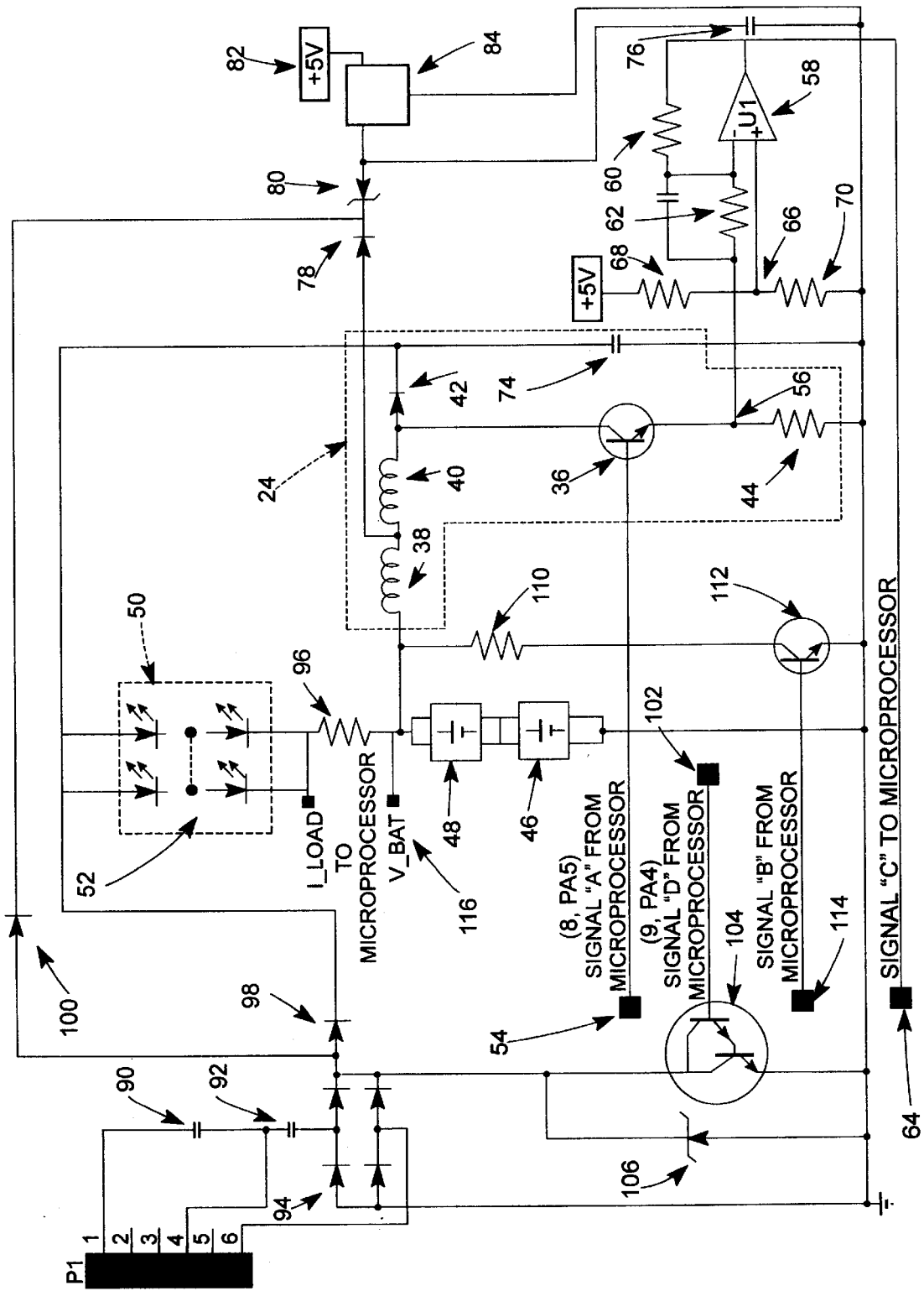
FIG. 2 is a simplified schematic illustrating central features of the first embodiment of the invention.
Figure 3:
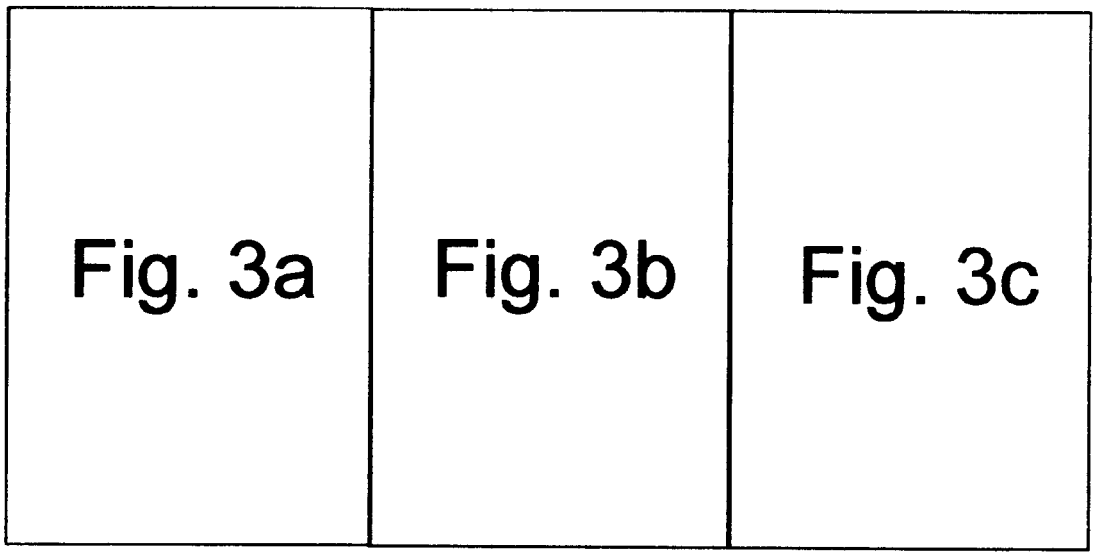
FIG. 3 is a diagram illustrating the relationship of FIGS. 3A, 3B and 3C.

Referring now to the drawings, FIGS. 1 through 3 illustrate a first embodiment of the invention as comprising an emergency lighting system seen generally at 10. In the system 10, lamping 12 preferably takes the form of an array of light emitting diodes arranged in series. The lamping 12 is operated under normal, non-emergency conditions through the power supply 14 which includes normal line voltage circuitry 16 for sensing the presence of AC line voltage being fed to the lamping 12 as an input signal fed to the circuitry 16 from the power supply 14, the circuitry 16 then feeding a signal to microprocessor 18. The microprocessor 18 controls boost converter 20 to supply power of reduced current to the lamping 12 on discontinuation of line voltage, voltage being supplied to the boost converter by means of battery 22. The microprocessor 18 also controls battery charging circuit 24 which shuts down on control by the microprocessor 18. The power supply 14 supplies power to regulator circuit 26 which supplies power to the microprocessor 18 with control exerted by the boost converter 20.

The microprocessor 18 further controls an indicator light emitting diode shown at 28 and can readily be configured to control options shown in phantom at 30, the system 10 therefore being extremely flexible. EEPROM 32 maintains a basic timing cycle and maintains an activity log useful for field return fault diagnosis. The EEPROM stores the number of hours of battery charge and discharge, the number of times a system went into emergency mode, the number of power failures, lamp failures, battery failures as well as other information which can conveniently be kept in a record by use of the EEPROM 32. The memory of the EEPROM 32 is also used to set predetermined configuration parameters during manufacture of the system 10, thereby guaranteeing accurate calibration without use of unreliable and costly potentiometers or the like. As will be described hereinafter, the EEPROM 32 provides other functions and advantages. It is to be understood that the electrically erasable and rewriteable read-only memory, that is, EEPROM 32, is central to the functioning of the present emergency lighting system 10. While EEPROM devices are well known in the prior art, the EEPROM 32 is used in a novel manner in the system 10 to reduce cost and to provide advanced diagnostic capabilities. Since it is an object of the invention to provide an emergency system capable of performing testing cycles at specified intervals, it is desirable for the system 10 to maintain testing cycles accurately in spite of power interruptions. EEPROM devices have previously been employed in emergency lighting systems for recording the state of the timing cycle should a power interruption occur. The present invention utilizes the EEPROM 32 for a variety of functions in addition to maintenance of the basic timing cycle.

Testing and diagnostics within the system 10 are carried out through the microprocessor 18 with test points being shown at 34 to include temperature, battery voltage, charger/load current and manual test switch inter alia as will be described in detail hereinafter.

Referring now to FIG. 2, it is seen that the boost converter 20 of the system 10 of FIG. 1 is comprised in FIG. 2 of transistor 36, inductances 38 and 40, diode 42 and resistor 44. The circuit elements 36 through 44, coupled with batteries 46 and 48 which are preferably NiCd batteries, act to convert a low battery voltage to a higher voltage and are thus capable of driving a light emitting diode lamp 50. Such circuitry is disclosed in U.S. Pat. No. 5,739,639, referred to hereinabove. The light emitting diode lamp 50 comprises an array of light emitting diodes 52 configured in any desired manner including as configured in the aforesaid patent.

The transistor 36 is controlled in response to a software program contained in the microprocessor 18, this control of the transistor 36 being accomplished through the use of a signal at 54 from the microprocessor 18, the microprocessor 18 not being seen in FIG. 2. When signal 54 is driven above 0.7 volts, the transistor 36 turns on and current flows from the batteries 46 and 48 through the inductances 38 and 40, via the transistor 36 and through the resistor 44, thus completing the circuitry to ground. The voltage at 56 therefore rises and is monitored by amplifier 58 with the gain of the amplifier 58 being set by resistors 60 and 62 so as to produce a maximum output, the output being approximately 4 volts, when no current is flowing. As the voltage at 56 rises, the voltage on a signal at 64 falls. At a certain point, as defined by the gain of the amplifier 58, the voltage at 66 set by a resistor divider formed by resistors 68 and 70 (the resistor divider being identified at 72), with that certain point being further defined by the threshold of the Schmitt trigger interrupt input (not shown) of the microprocessor 18 of FIG. 1, the certain point being connected to the signal at 64, the microprocessor 18 being interrupted. The microprocessor 18 then turns off the transistor 36 for a predetermined "offtime" by setting the signal at 54 to ground allowing energy stored in the inductances 38 and 40 to be released via the diode 42 into capacitor 74 and, via diodes 78 and 80, into capacitor 76. The microprocessor 18 then turns the transistor 36 back on again, repeating the energy transfer cycle.

Operation of the present system as described hereinabove has advantages over prior art systems employing a simple oscillator in that the peak current through the inductances 38 and 40 is a fixed value regardless of the value of the inductor or load, the only significant variation being caused by the tolerances of the resistors 44, 68 and 70 and a five volt power supply voltage which is regulated, the voltage being indicated at 82. Total variation is therefore around ten percent. By regulating the peak current, the maximum lamp current is regulated and a more consistent light output is maintained.

Using the signal at 54, the microprocessor 18 can therefore determine whether to operate an inverter, that is, the boost converter circuit 20 as required by software operating the microprocessor 18. Further, the microprocessor 18 determines a desired "OFF time". By varying the OFF time of the inverter, average lamp brightness can be controlled to best advantage in the operation of differing lamps and in view of differing local regulations or differing product variations where lamp brightness can be traded for battery life depending upon relative importance in a given installation. In the present system, the "OFF time" and the variation of "OFF time" during a battery discharge are set by parameters recorded on a product-by-product basis in the memory chip (not shown) of the EEPROM 32 during factory calibration.

A software-controlled battery discharge profile can thus be set as necessary, such variation in product capability being achieved essentially at no cost.

Microprocessor control of the inverter involves use of the two inductances 38 and 40 rather than a single inductor as is common in the prior art. In the present system 10, the inverter also powers the microprocessor 18 and its support circuitry when in emergency mode. The two inductances 38 and 40 form a "split inductor" which allows a lower voltage to be provided to the input of regulator 84 than the voltage which is provided to the lamp 50. As can also be appreciated, the regulator 84 acts to generate the precise five volts required by the microprocessor 18. Accordingly, addition of two low cost components, that is, the inductance 38 and the diode 78, results in an increase of up to ten percent in overall power conversion efficiency when the inverter is operating, thereby allowing a greater proportion of battery energy to be provided to the lamp 50 to meet lamp brightness requirements as necessary.

Once the inverter of the system 10 ceases to operate as determined by the software of the microprocessor 18, no power is supplied to the microprocessor 18 or its associated support chips (not shown in FIGS. 1 and 2). The diode 80, which comprises a Zener diode, blocks the current path from the batteries 46 and 48 via the inductance 38 to the regulator 84 which is the five volt regulator. If a voltage of less than 3.3 volts exists across the Zener diode 80, no current flows. Since the batteries 46 and 48 have a nominal voltage of 1.2 volts each and a realized maximum terminal voltage of approximately 1.4 volts, the Zener diode 80 will never conduct unless the inverter is operating. If the microprocessor 18 is not powered, then the microprocessor does not provide the signals at 54 and at 88 and total power consumption is essentially zero.

Accordingly, no need exists to isolate the terminals of the batteries 46 and 48 during shipping to prevent complete discharge or damage caused by a battery polarity reversal, conditions which can develop with two series cells when one cell becomes completely discharged. Prior art lighting systems require battery isolation by disconnection or addition of a temporary insulator. Control of the inverter through the microprocessor 18 further reduces cost and reduces the possibility of an installation mistake such as by forgetting to remove an insulator (not shown) from an isolation position relative to the batteries 46 and 48.

Advantages derived through use of the EEPROM 32 have previously been alluded to. In addition to maintaining a basic timing cycle, the EEPROM 32 provides additional advantages which include elimination of the use of potentiometers and the manual process of setting such potentiometers in a factory environment. Emergency systems require accurate calibration to ensure that charge voltages and currents are correct, that the system goes into emergency mode at the required mains voltage (80% of nominal) and begins charging at the required voltage (85% of nominal). Calibration software can further be provided to the microprocessor 18, the calibration software interacting with software in automated factory test equipment to store required thresholds in the EEPROM 32. Storage in the EEPROM 32 of configuration parameters allows control of system operation and system features. In addition to the features described above relative to the configuration of "OFF time", certain features are made available only on certain products and it is desirable to be able to easily change the features at the time of manufacture without using differing versions of software running in the microprocessor 18. This ability is particularly desirable when the microprocessor 18 is "masked" with predefined code during manufacture. The system 10 configured according to the present invention contains 52 bytes of configuration information which the microprocessor software uses to control operation. The invention uses 40 bytes of EEPROM storage to count events such as the number of brownouts and specified tests for later evaluation should a product be returned from the field. Precise evaluation is thus allowed of the performance of the system 10 under actual conditions and allows improvement using such knowledge.

Prior art self-test/self-diagnostic systems typically use a relay to connect an emergency lamp to a battery when power fails and/or to disconnect input power to a charger during diagnostic cycles to check transfer switch operation. Due to the fact that relays are typically expensive, it is therefore desirable to eliminate the use of relays in the first embodiment of the invention if at all possible due in part to use of NiCd batteries as the batteries 46 and 48. Further according to the present invention, and specifically the first embodiment thereof, a number of diodes are used to separate the power to various circuit elements, thereby eliminating the need for a relay. The basic circuit topology of the system 10 is similar to the non-diagnostic emergency system described in the aforesaid patent. In this basic circuitry, an input of 277 volts or 120 volts to either capacitor 90 or capacitor 92 respectively reduces the AC mains voltage, a bridge rectifier 94 converting the mains voltage from AC to DC, the DC current passing through light emitting diodes 52 of the lamp 50 through current measurement resistor 96 and the batteries 46 and 48 before returning to the rectifier 94. It should be understood that a string of the light emitting diodes 52 can be taken to be any desirable number and not be limited to the four light emitting diodes shown in FIG. 2.

The boost converter 20 described previously herein includes the diode 42 in its topology and, by adding diode 98 to the path from the normal power supply, normal power and emergency power can be combined to drive the same lamping, that is, the lamp 50. Power for the electronics of the microprocessor 18 is also derived from the normal power supply via diode 100 and is combined with the output of the inverter, that is, the emergency power, via the diode 78. Accordingly, both the lamp 50 and microprocessor electronics are effectively powered by either source without the need for a relay. Additionally, microprocessor signal 102 is used to drive a transistor 104 to shunt the AC power source to allow software to perform diagnostic tests. By using the series battery/light emitting diode lamp technology of the aforesaid patent, the total power available from the AC power source can be kept small with easy bypass being possible through use of the small low cost Darlington transistor 104 shown in the circuit. Zener diode 106 is disposed across the transistor 104 for transient voltage protection.

Figure 3A:
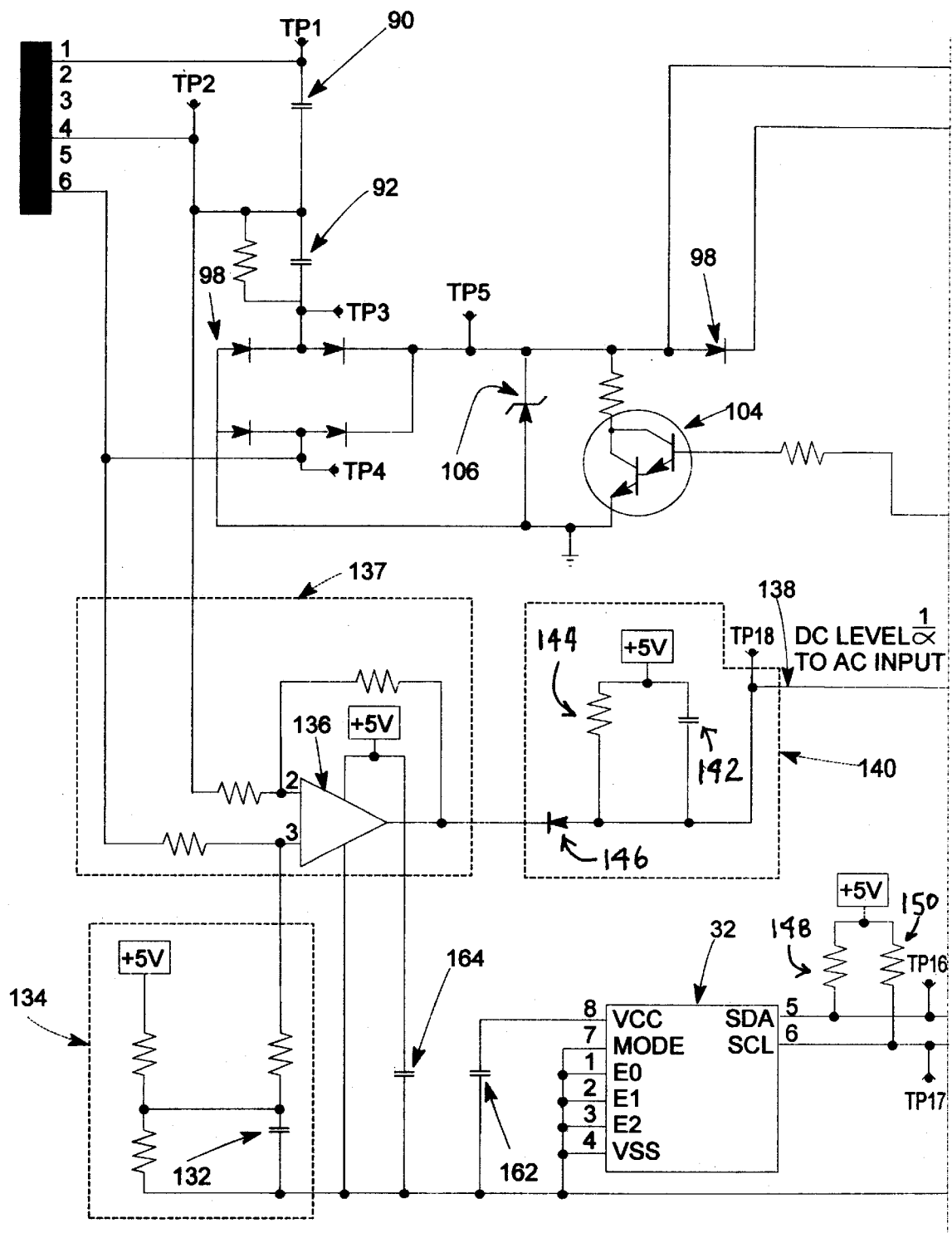
FIGS. 3A, 3B and 3C in combination form a schematic of a charger circuit utilized in the first embodiment of the invention.
Figure 3B:
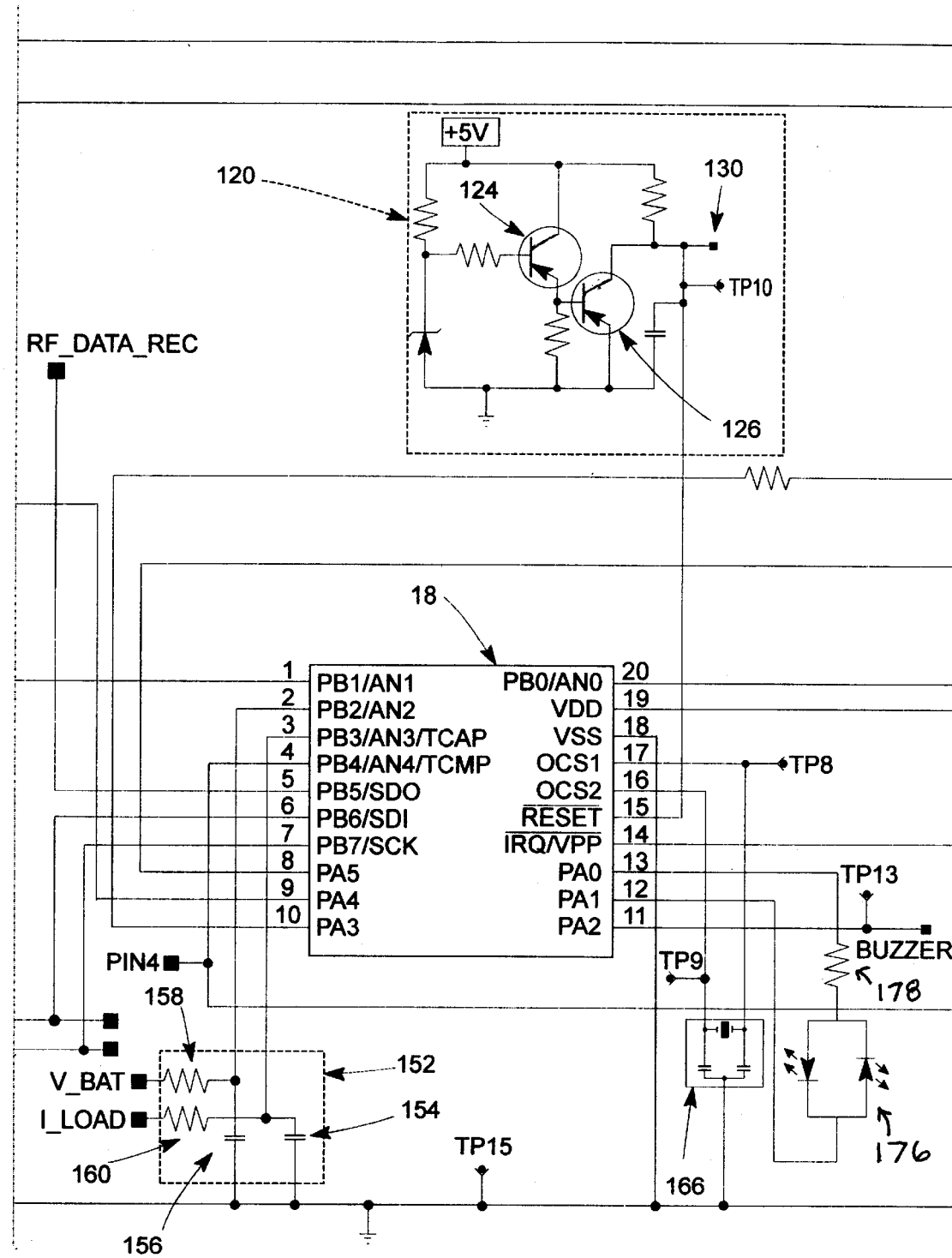
Figure 3C:
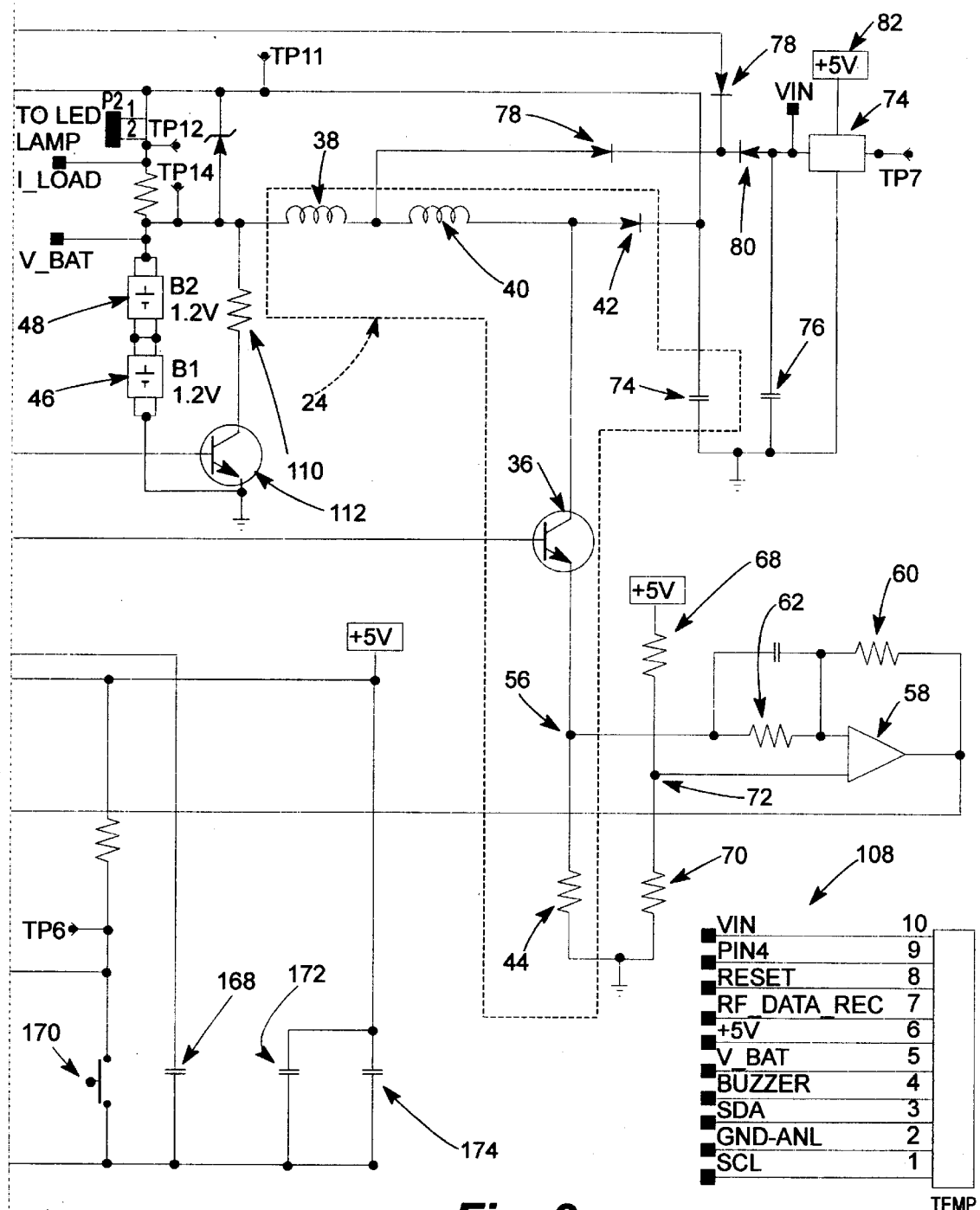
Figure 4:
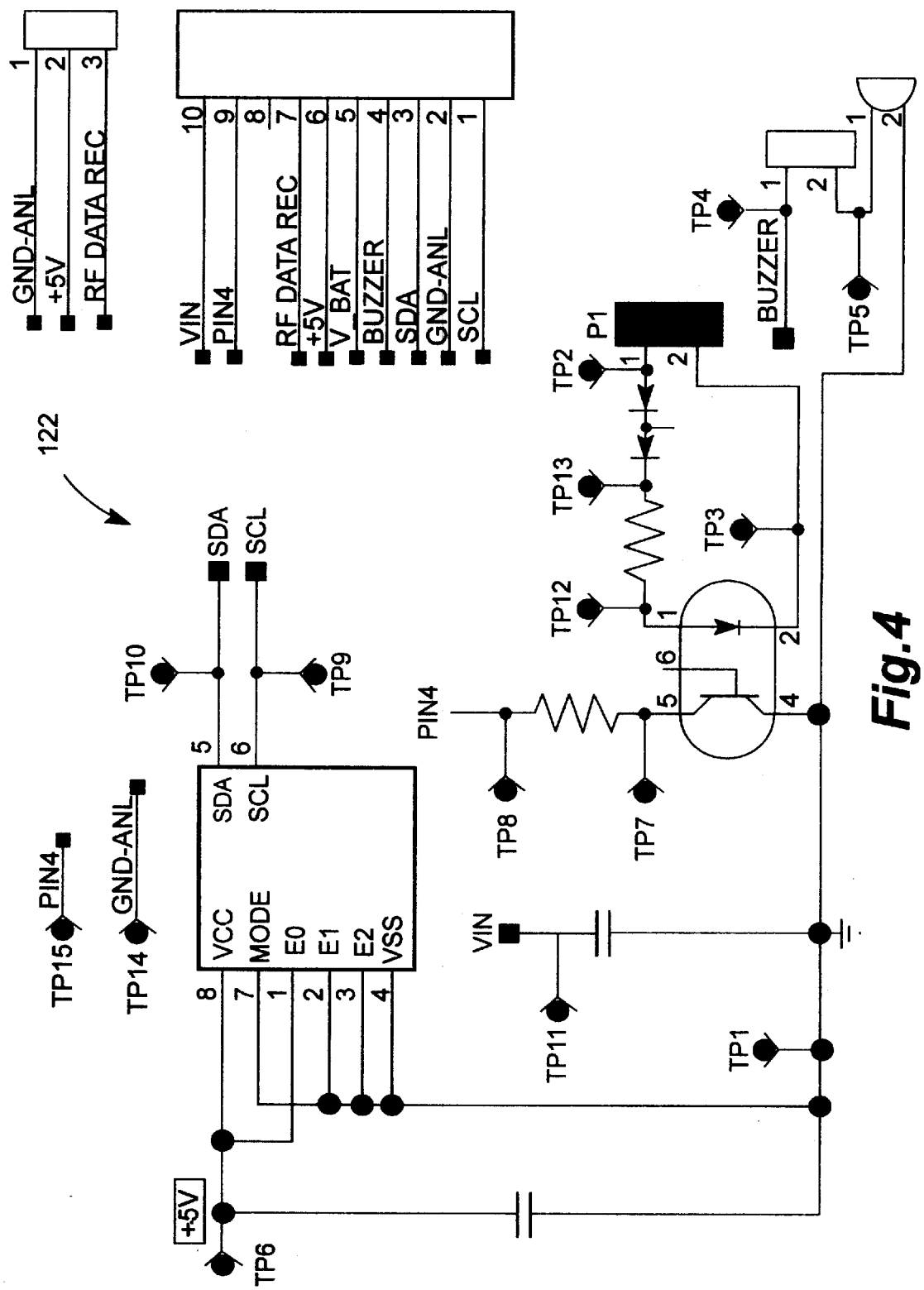
FIG. 4 is a schematic of a self-diagnostic option board.

FIG. 3 is a block diagram showing the relationship of FIGS. 3A, 3B and 3C, which FIGS. 3A, 3B and 3C illustrate in combination certain circuitry utilized in a first embodiment of the invention, the space available on a sheet of drawings being insufficient to allow said circuit to be reproduced on a single sheet. Reference to FIG. 3 herein constitutes a reference to the circuitry shown in the combined illustrations of FIGS. 3A, 3B and 3C. As is seen in FIG. 3, a ten-pin connector 108 can be employed for providing all essential signals and power from the microprocessor 18 to one or more optional circuit boards such as seen in FIG. 4 to provide optional features. As is indicated at 30 in FIG. 1 and in relation to FIG. 3, the connector 108 connects to reset circuitry 120 to provide unregulated DC power for subsystems shown on options board 122 which regulate their own five volt or higher power supplies. The connector 108 further provides a reset signal, regulated five volts for circuits which require five volts, battery voltage for allowing other circuits to monitor battery voltage, a buzzer output seen in FIG. 4 for systems requiring audible alarms and a one-wire serial data connection to a low power radio receiver (not shown) thus allowing remote control devices to be used to trigger self-test or other modes. Various daughter boards providing options can be plugged into the converter 108. Still further, a pair of wires carrying industry standard I$^2$C data signals from the EEPROM 32 and the microprocessor 18 allow intelligent subsystems to communicate with the self-diagnostic microprocessor. Full charging of a rechargeable battery results in dissipation as heat all the energy taking the form of electric current flowing through the battery cell. Increasing the temperature of a battery cell reduces cell life. Microprocessor control of a shunt battery regulator configured as shown herein in FIG. 2 has as its purpose the reduction in charge current to the minimum required to overcome the effects of self-discharge once the battery is to be charged. The circuitry shown in FIG. 2 is similar to the shunt regulated battery charging system of U.S. Pat. No. 5,646,502, the disclosure thereof being incorporated hereinto by reference. The system of the patent is essentially identical in most respects to the circuitry of FIG. 2 with the exception that the microprocessor 18 controls the process.

Referring again to FIG. 2, it is to be understood that a percentage of the battery charge current through the lamp light emitting diodes 52 via the resistor 96 will flow through the resistor 110 and the transistor 112 when the microprocessor generates a positive voltage above 0.7 volts at signal 114. A circuit is thus provided which allows the microprocessor 18 to reduce the charge current once the batteries 46 and 48 have been charged for a given time or have reached a given voltage as measured at 116. Battery life can be extended substantially by providing such circuitry.

The invention is further understood by reference again to FIG. 3, which includes the circuitry of FIG. 2 therein. As noted above, FIG. 2 essentially illustrates a mains input power circuit section, a boost converter essentially comprising the inverter 20 and lamp and battery configurations. The entire circuitry of FIG. 2 is incorporated into the circuit of FIG. 3. As has been indicated previously, the reset circuitry 120 effectively looks at a five volt line and remains inactive unless a drop occurs on the five volt line. If a drop occurs, the reset circuitry 120 outputs a low pulse which resets the microprocessor 18, the microprocessor 18 being brought back to a given point in the program controlling the self-diagnostic function. Transistors 124 and 126 function with Zener diode 128 inter alia to provide the reset function within the circuitry 120, manual reset at 130 also being provided.

As carryover from the description of the circuitry of FIG. 2, it is to be understood that the transistor 104 is utilized to simulate power outages through turning said transistor on. The transistor 36 essentially comprises the heart of the boost converter 20.

Continuing on with the circuitry of FIG. 3, capacitor 132 is seen to function as a filter capacitor and to provide DC offset at 134, the resistors comprising the DC offset 134 dividing the network to monitor the power line. Operational amplifier 136 effectively detects the level of AC line voltage and connects to DC level by comparison to a reference voltage. At 138, DC level is one/infinity to AC input. Integrator 140 comprised of capacitor 142, resistor 144 and diode 146 is disposed between the operational amplifier 136 and the microprocessor 18 in order to provide appropriate function. Pull up resistors 148 and 150 are provided between EEPROM 32 and the microprocessor 18. DC level filtering is provided at 152 by capacitors 154, 156 and resistor 158, 160. One of the capacitors looking at battery voltage while the other looks at load current to provide a leveling filter function. In essence, the operational amplifier 136 comprises the heart of a difference amplifier 137. The output of the difference amplifier 137 is DC level which is inversely proportional to AC output.

The EEPROM 32 essentially comprises a memory device having a non-volatile program which stores configuration variables used to make decisions. Log variables are also stored by the EEPROM 32 to provide a record of failures and the like. Even if power is discontinued to the EEPROM 32, information is kept even in the absence of battery power or AC mains power. Capacitors 162 and 164 essentially comprise decoupling capacitors which suppress noise. The serial connection between the EEPROM 32 and the microprocessor 18 allows expansion of functionality with other plug-in modules.

Remaining portions of the circuitry of FIG. 3 including a crystal clock 166 comprising a two megahertz resonator providing clocking for microprocessor frequency standards. Timing functions for the analog to digital converter in microprocessor 18 are provided by capacitor 168. Switch 170 is provided for test purposes particularly for testing, rescheduling tests or cancelling tests. Capacitors 172 and 174 stabilize the five volt power supply and bypass high frequencies. Diode arrangement 176 provides bicolor light emitting diodes functioning with resistor 178 as an indicator circuit.

In essence, the microprocessor 18 comprises integrated circuitry having various control functions. In particular, if the microprocessor 18 detects loss of power, data is stored to the EEPROM 32 in order to save operational history.

Figure 5:
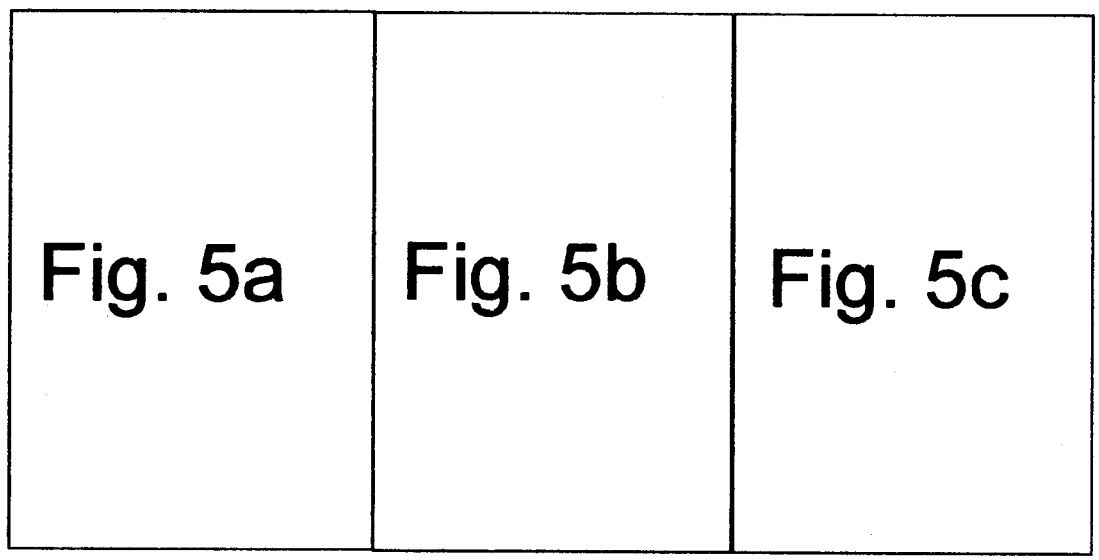
FIG. 5 is a diagram illustrating the relationship of FIGS. 5A, 5B and 5C.

Considering now the second embodiment of the invention as is particularly shown in FIG. 5, it is to be noted that the differences between the circuitry of FIG. 5 and FIG. 3 are related as has been described hereinabove to basic load and battery chemistry considerations as exist between emergency exit signage utilizing light emitting diodes, requiring the circuitry of FIG. 3, and emergency unit equipment utilizing incandescent lamping, requiring the circuitry of FIG. 5. In the circuitry of FIG. 3, nickel/cadmium batteries are utilized as the emergency power source while lead-acid batteries are utilized with the circuitry of FIG. 5.

Much of the circuitry of FIG. 3 is incorporated into the circuitry of FIG. 5, particularly the microprocessor 18 and the EEPROM 32. Further, reset circuitry 120 is essentially identical as are the crystal clock 106 and the connector 108. D.C. local filtering at 152 is produced in a similar fashion and the pull-up resistors operate in a similar manner. The difference amplification function centering on the operational amplifier 136 and associated circuitry is also provided in the same manner as is the D.C. offset function at 134. Other similarities exist between the circuits of FIG. 3 and FIG. 5.

The following description of FIG. 5 is based in part upon differences between the self-diagnostic circuits of FIG. 3 and FIG. 5 respectively.

Figure 5A:
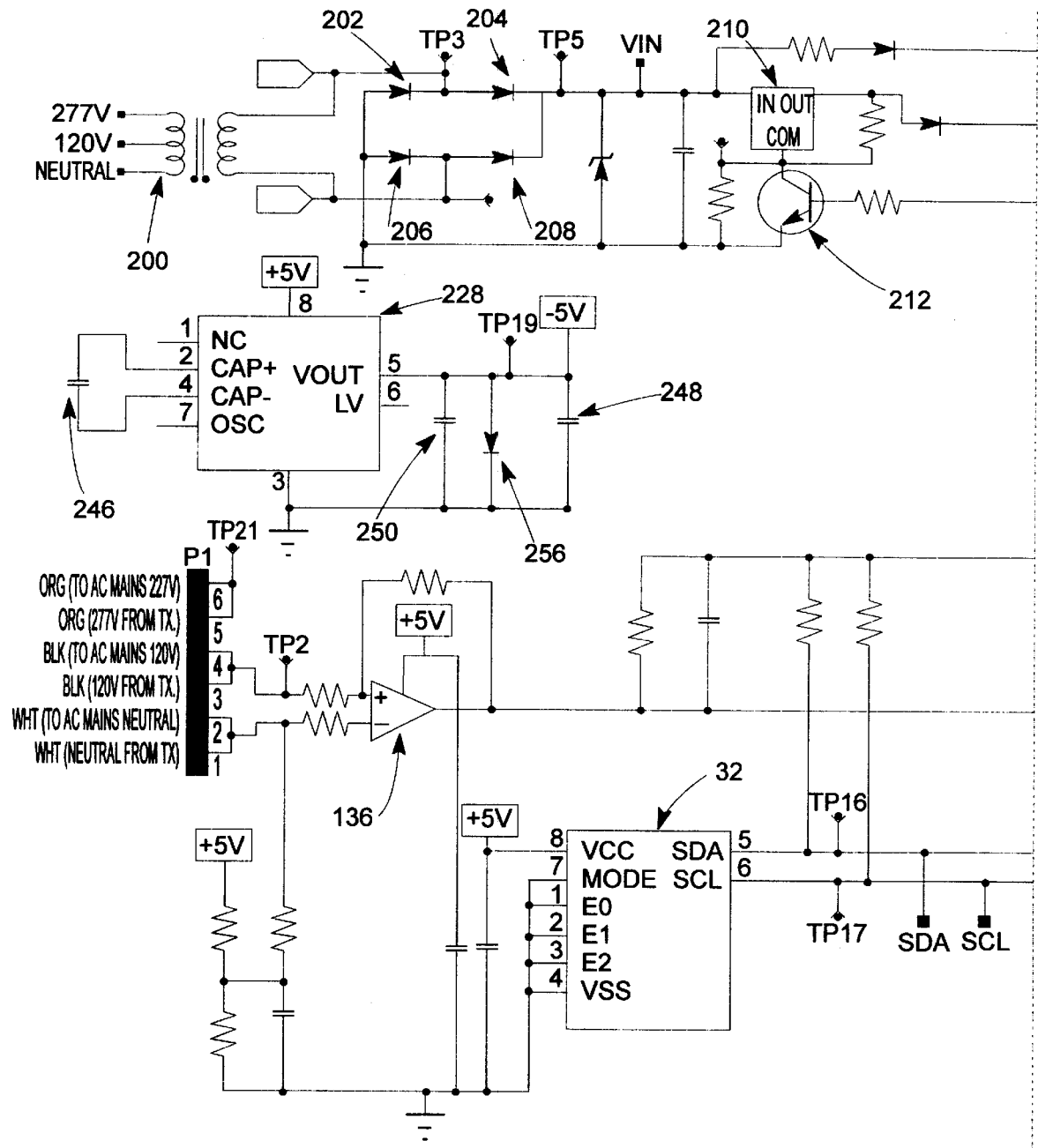
FIGS. 5A, 5B, and 5C in combination form a schematic of a circuit utilized in the second embodiment of the invention.
Figure 5B:
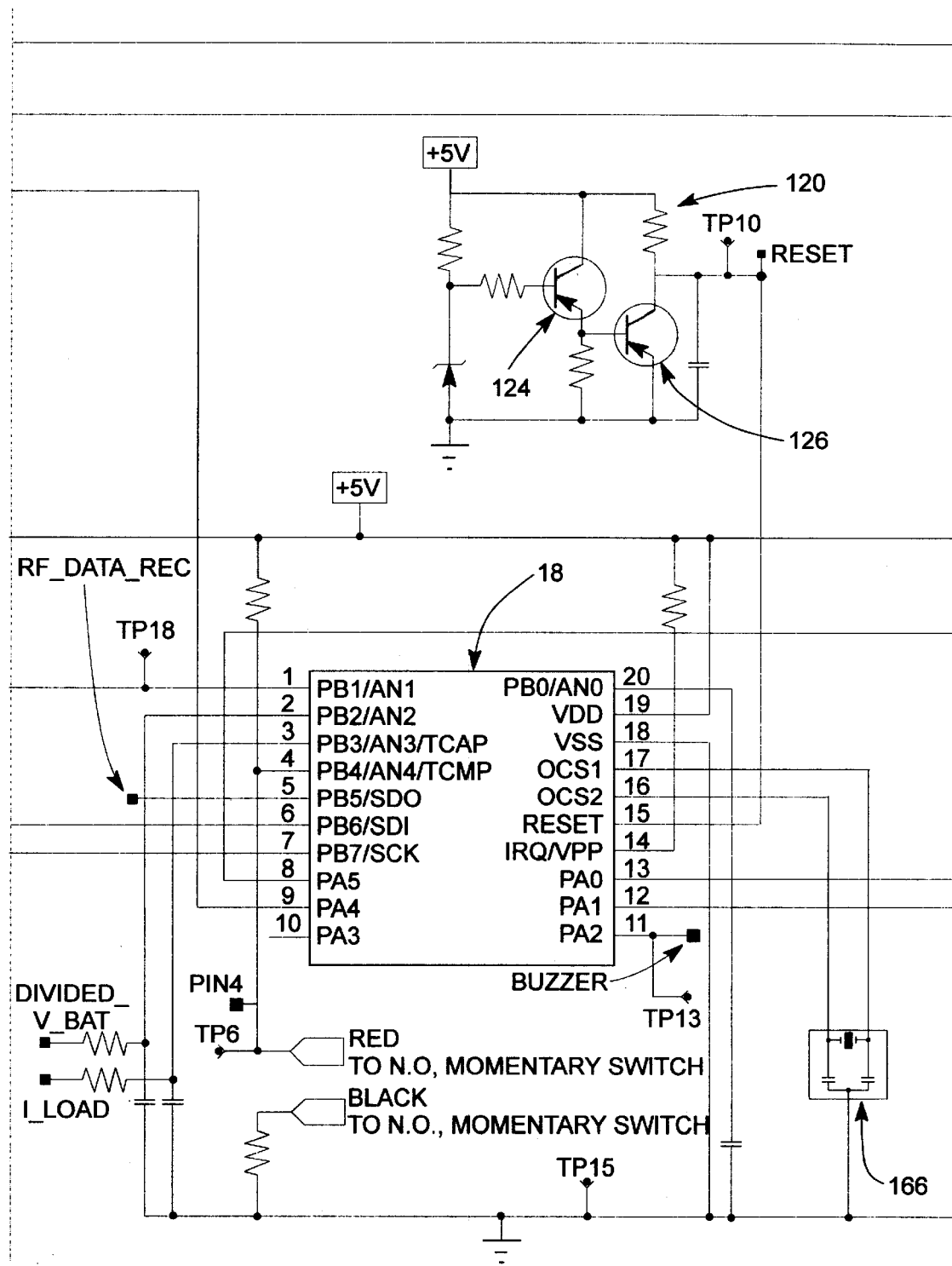
Figure 5C:
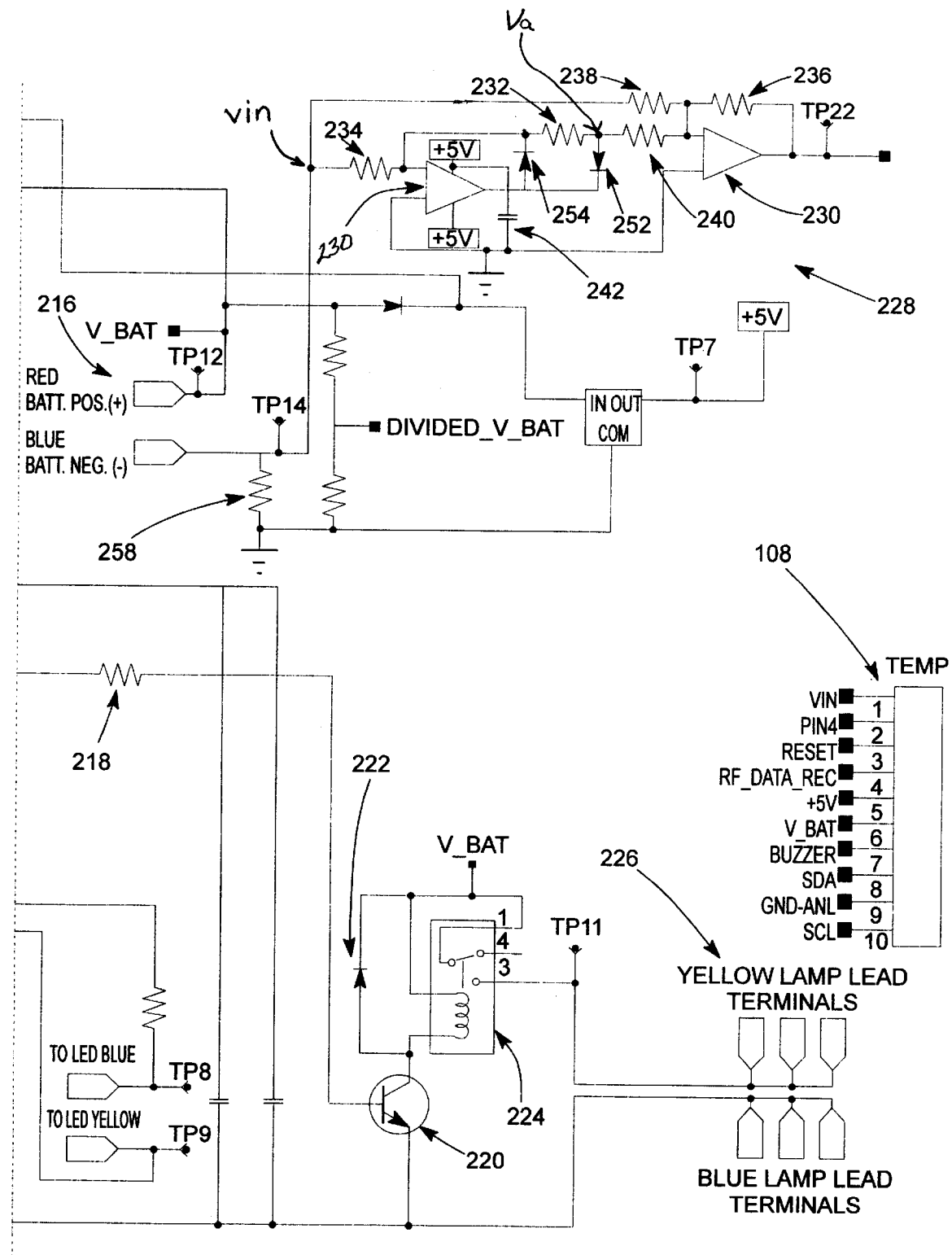

It is to be understood that FIG. 5 is a block diagram showing the relationship of FIGS. 5A, 5B and 5C, which FIGS. 5A, 5B and 5C illustrate in combination certain circuitry utilized in a second embodiment of the invention, the space available on a sheet of drawings being insufficient to allow said circuitry to be reproduced on a single sheet. Reference to FIG. 5 herein constitutes a reference to the circuitry shown in the combined illustrations of FIGS. 5A, 5B and 5C. For those portions of the circuitry of FIG. 5 which differ from the circuitry of FIG. 3, a more detailed discussion will be provided hereinafter.

The D.C. input capacitors 90 and 92 of FIGS. 2 and 3 comprise an impedance divider network responsible for reducing input voltage and limiting input current to the circuitry of FIG. 3. In FIG. 5, a step-down transformer 200 is employed to produce this function. The transformer 200 combines with bridge rectifier diodes 202, 204, 206 and 208 and voltage regulator 210 to comprise the main current carrying elements of the charger circuitry of FIG. 5. Transistor 212 controls the voltage regulator 210 which is used as a pass element for the charge current in the circuitry of FIG. 5. The microprocessor 18 of FIG. 5 provides a control signal from pin 9 to turn charge current on and off to battery 216 via the transistor 212 and the voltage regulator 210. The software program contained in the microprocessor 18 determines whether this "switch" is on or off. In essence, the software program in the microprocessor 18 is responsible for regulating charge voltage, via pin 9, to a temperature-compensated voltage level, based on charge current and battery voltage that the microprocessor 18 is monitoring, via pins 2 and 3, of the microprocessor 18.

Software control in the circuits of the invention for implementation of charger control is advantageous relative to chargers utilizing hardware for control of voltage regulation set points and temperature compensation adjustment factors. In particular, these advantages include the fact that software control-allows a system to take advantage of the monitoring of battery voltage and current inherent in the self-diagnostic system and utilizes this function for the dual purpose of charge control. Further, such a system is easily configurable to different battery voltage levels and battery chemistries by simply changing configuration variables used by the software program contained in the memory of the EEPROM 32, these configuration variables containing charge voltage level setpoints and temperature compensation factors. Still further, the microprocessor 18 can make use of an internal temperature sensing diode to provide a low cost method of measuring the temperature inside of the unit so that the charger output voltage can be temperature compensated for ambient temperature to maximize battery life at temperature extremes.

Referring back to FIG. 5 in particular, a lamp output section of the circuitry of FIG. 5 consists of a simple relay transfer circuit comprising resistor 218, transistor 220, diode 222 and relay 224. This relay transfer circuit essentially replaces the inverter and peak current detection components of the circuitry of FIG. 3. Pin 8 of the microprocessor 18 is used to turn on and off the relay 224 via the transistor 220 when microprocessor software detects AC power failure or for scheduled self-diagnostics testing. Since the incandescent lamping 226 of FIG. 5 provides a larger DC load in the emergency mode, it is necessary to utilize the relay transfer circuit shown in FIG. 5.

In the circuitry of FIG. 3, a simple current sensing element is provided in the form of the resistor 96. In the circuitry of FIG. 5, a current sensing circuit is seen to be provided by processor 18, amplifier 230, resistors 232, 234, 236, 238, 240 and 258; capacitors 242, 246, 248 and 250; and diodes 252, 254 and 256. A voltage converter circuit is provided by the voltage converter integrated circuit 228 and the capacitors 246, 248 and 250 and diode 256, this voltage converter circuitry 228 providing a −5V rail for the amplifier circuit which is formed around the amplifier 230. The amplifier circuit formed around the operational amplifier 230 is a variation of an active non-saturating, full-wave precision rectifier circuit such as is referred to as an absolute value circuit. The left-hand portion of the circuit is an active-wave rectifier circuit while the right-hand portion of the circuit is an inverting summing amplifier.

In operation, the circuitry of FIG. 5 should first be considered to be in the emergency mode. In this state, the coil of the relay 224 is energized to provide a path for battery current to flow to ground through the lamping 226 which comprise DC lamps. This lamp current by design must flow back into the negative terminal of the battery 216 through sense resistor 258, thereby creating a negative voltage potential with respect to ground at vin. With vin as a negative input voltage, the output va of the left-hand rectifier circuit is va=0. Accordingly, one input to the summing circuit has a value of zero. However, vin is also applied as an input to the summing circuit. The gain for this input is set up by the resistors 236 and 238 and is equal to −5 using the well-know equation for inverting amplifiers −Rf/Ri. Since vin is negative and the gain of the circuit is also negative, the output v0=−5−vin and will be positive for this condition.

When emergency unit equipment utilizing the circuitry of FIG. 5 is powered by alternating current and is charging the battery 216, charge current flows through the battery 216 and the sense resistor 258 to ground, thus creating a positive voltage at vin. In this condition, the output of the left-hand rectifier portion of the circuit va=−vin. The voltage va appears as one input to the summing circuit, and the gain for that input is −15. As before, vin also appears directly as an input to the summing circuit. The net output is then v0=−5vin−15va=−5vin−15(−vin)=10vin. The output of the circuit is therefore positive with a gain of 10 which provides more amplification of the smaller input voltages which will occur once the battery 216 is charged and the current flow is reduced to a trickle charge.

The circuitry thus described provides a number of benefits for accomplishment of the self-diagnostic function. In particular, the microprocessor 18 has the ability to calibrate itself to the output of the circuitry during the manufacturing process, thereby avoiding the use of high tolerance components or trim pots while still maintaining an accurate measurement of current magnitude. Further, the transformation of both negative and positive input voltages to positive output voltages meets the requirement of the microprocessor Analog to Digital (A/D) input requirements for a positive input voltage less than a 3.5V dc. The present circuit also provides the ability to provide a higher gain for smaller voltage drops across the sense resistor 258 when the unit is charging to allow the circuitry to more accurately measure charge current. The ability of the present circuit to provide lower gain when operating in the emergency mode and when the voltage drop across the sense resistor 258 is therefore greater, allows the circuitry to measure the larger currents which flow when the lamping 26 is on without exceeding maximum input voltage on the A/D input of the microprocessor 18. While specific gain values are listed herein, these gain values can change with wattage.

The algorithms necessary for production of software for programming of the self-diagnostic system seen in FIGS. 3 and 5 are hereinafter provided in tabular form for purposes of simplicity. The language of the algorithm presentations is not numbered to conform to particular hardware of the circuits of FIGS. 3 and 5 but are described in language which allow recognition of hardware components where necessary.

The algorithm presentations begin with Table I which describes "Variables". The algorithm presentation beginning with Table I relates essentially to exit signage using NiCd batteries. The algorithm presentation beginning with Table II relates essentially to emergency unit equipment using lead-acid batteries.

TABLE I

VARIABLES

| Variable | Type | Description | Range of values | size | units | default |
|---|---|---|---|---|---|---|
| Version | Config | Version string | X.XX | 4 char | | 1.00 |
| Date_manufacture | Config | A string containing the manufacturing date | 971101 | 6 char | | |
| Product_name | Config | A string for human recognition only. Probably the assembly number | XXXXXXXXXX | 10 char | | product |
| Product_number | Config | A unique number, identifying each product, incremented each time a product is tested and configured on the ATE | | 24 | | 0 |
| Product_type | Config | Defines product type. This variable also determines pin usage on the micro | 1 = EXIT with inverter 2 = unit 3 = inverter | 8 | | product |
| Features_enabled | Config | Defines enabled features Combined with SD2 switch settings as a mask to determine exact product functionality | see separate table | 8 | | product |
| Batt_type | Config | We expect to use NiCad and Lead acid battery chemistries. Nicad requires 2-level charging (full or trickle) controlled by PA3. No need for temperature compensation. Actual charge current and voltage levels are determined by external hardware. Lead acid has full, and trickle voltages and has calibrated temp. compensation of charge voltage. The charge voltage (V_full) should reduce by 2.1 mV/° C. Voltage level controlled by micro by PWM integration. Current limited by external electronics. | 1 = Nicad 2 = Lead Acid | 8 | | product |
| V_LVD | Config | Low voltage disconnect voltage This is the voltage at which the battery must be disconnected the load to prevent "deep discharge" damage. The load must always be disconnected at this voltage, regardless of other requirements. | | 16 | millivolts | product |
| V_full | Config | Full charge voltage This is the max. battery voltage allowed for full current charging. If the product is lead-acid, this is the voltage that the output is regulated to in full charge mode. External current limiting may reduce the achievable voltage below this level. | | 16 | millivolts | product |
| V_OK | Config | Battery OK voltage (upper limit) This is the max. allowable battery voltage. If a voltage is measured above this, then the battery is assumed to have been disconnected or gone open circuit or otherwise damaged. Indicate BATTERY_FAIL. | | 16 | millivolts | product |
| V_low_batt | Config | Battery low voltage (lower limit) This is the min. allowable battery voltage. If a voltage is measured lower than this, then a cell is assumed to have gone short circuit, or is otherwise damaged. Indicate BATTERY_FAIL. | | 16 | millivolts | product |
| V_trickle | Config | Lead-acid only. Trickle charge voltage (charge voltage is regulated to this level) | | 16 | millivolts | product |
| I_trickle | Config | Lead-acid only. Trickle charge current (current threshold used to decide that the battery is fully charged). | | 16 | mA | product |
| V_brownout | Config | The mains voltage level below which we go into emergency mode | | 16 | Raw A/D reading | cal |
| V_charge | Config | The mains voltage level above which we go back into charger mode | | 16 | Raw A/D reading | cal |
| I_load_min | Config | lamp load must be greater than this otherwise we indicate LAMP_FAIL | | 16 | mA | product |
| batt_cap | Config | Defines the total battery capacity | | 16 | mA hours | product |
| Frequency_test_short | Config | Defines how often the short test is run | | 16 | hours | 720 |
| Seconds_test_short | Config | time for short self-test | | 8 | secs | 30 |
| Seconds_test_man | Config | time for manual test (button / remote input) | | 8 | secs | 30 |
| Frequency_test_long | Config | Defines how often the long test is run | | 16 | hours | 4320 |
| Mins_test_long | Config | factory configured time for long self-test | | 8 | mins | 30 |
| Hours_reschedule | Config | The time to offset a test if the battery is not fully charged | | 8 | hours | 24 |
| Hours_delay | Config | The time to offset a test if the user presses the test button (or remote) during a (successful) scheduled test | | 8 | hours | 8 |
| Batt_cap_short | Config | Defines the min. batt % for the short test or manual test to be run. If < this %, a short test is delayed by hours_reschedule, manual test is aborted. | | 8 | % | 70 |
| Batt_cap_long | Config | Defines the min. batt % for the long test to be run - otherwise it is delayed by hours_reschedule | | 8 | % | 90 |
| Discharge_ratio | Config | Estimate of the ratio between the load voltage and charge voltage for the given product, including an efficiency factor if needed. For exits that use inverters, the load voltage is~lamp voltage. Used to determine batt_cap | | 8 | Exact ratio | Product |

TABLE I-continued

VARIABLES

| Variable | Type | Description | Range of values | size | units | default |
|---|---|---|---|---|---|---|
| Sense_res | Config | A value allowing s/w to calculate the relationship between measured voltage and actual charge current | | 16 | milliohms | Product |
| Off_time | Config | A loop count value, giving the off-time for the inverter (LED exits only). 6 μs per count. 0 = 5 μs, 1 = 11 μs, 2 = 17 μs etc | | 8 | counts | Product |
| DC_scale | Config | The scale factor generated as a result of calibration V_dc = (a2d_delay * DC_scale) / 65536 | | 16 | Raw A/D reading | 0 |
| Time2ShortTest | Config | The number of hours until start of the next short test | | 16 | Hours | 30 |
| Time2LongTest | Config | The number of hours until start of the next long test | | 16 | Hours | 168 |
| OfftimeIncdelay | Config | The number of minutes between increments of the off_time | | 8 | counts | Product |
| MaxOffTime | Config | The maximum value of the off-time variable for the inverter (LED exits only). | | 8 | counts | Product |
| Mins_batt_fail | Config | If a discharge lasts longer than this, the number of battery failures in incremented in the log, but no error is shown (used for product evaluation). Only updated if the battery was fully charged at start of discharge | | 8 | Mins | 60 |
| Temp_comp | Config, on ATE | A variable (or variables) written by the ATE during calibration to define the relationship between the internal temp diode reading and the offset or factor to apply to V_full. This might be a table. | | ??4 char | | Cal |
| Handshake | Config, on ATE | A location for the ATE and the micro to write their status bytes to perform handshaking | | 8 | | 0 |
| Min_battery_runtime | Log | The minimum number of minutes that the unit has run in test or emergency mode to LVD since day 0. Only updated if the battery was fully charged at start of discharge | | 8 | Mins | 255 |
| Charge_level | Log | Estimate of the current battery charge level | | 32 | mA mins | 0 |
| I_load_learnt | Log | Current recorded during learn | | 16 | mA | 0 |
| Count_brownouts | Log | Number of power failures | | 16 | events | 0 |
| Count_LVD | Log | Number of times went into LVD, from a fully charged state | | 16 | events | 0 |
| Count_user_test | Log | Number of times user has pressed test button or remote | | 16 | events | 0 |
| Count_short_test | Log | Number of times short test has run | | 16 | events | 0 |
| Count_long_test | Log | Number of times long test has run | | 16 | Events | 0 |
| Count_lamp_fail | Log | | | 16 | Events | 0 |
| Count_batt_fail | Log | | | 16 | Events | 0 |
| Mins_running | Log | Total time product has been running since day 0. Can take the modulo of this value to determine when to do a test | | 24 | Mins | 0 |
| Mins_hicharge | Log | Total time product has been charging at full since day 0 | | 24 | Mins | 0 |
| Mins_tricklecharge | Log | Total time product has been charging at trickle since day 0 | | 24 | Mins | 0 |
| Mins_total_discharge | Log | Total time product has been in discharge since day 0 | | 24 | Mins | 0 |
| Mins_Total_LVD | Log | Total of the minutes running in discharge, when the discharge ended in LVD, and started from a fully charged state. Used with "Count_LVD" to determine average time to LVD over product life. | | 24 | Mins | 0 |
| Error_code | Log | Log of the last error. 8 bit error code is a number representing the mnemonics listed in "LED states" with any additional data relevant to the failure in the other 8 bits | | 16 | error code | 0 |
| Mins_total_test | Log | Total time product has been in test since day 0 | | 24 | Mins | 0 |
| Mins_last_test | Log | The timestamp of the last test - copy of Mins_running at the time of the last test | | 24 | Mins | 0 |
| Temp_ref_read | Log | Measured temp ref value during power-up | | 16 | Raw A/D reading | 0 |
| ROM_checksum | Log | Calculated during calibration, so ATE can compare with the published value | | 16 | raw value | 0 |
| F_FA_Fl_offtimeadj | Config | When Flashing, Flashing/Audible, or Fire Alarm Interface options are enabled, inverter off time is adjusted by this value | | 8 | counts | Product |

Note:
calibration values should be stored in a fixed area at the start of EEPROM so that the product configuration can be changed later without changing the ATE calibration. E.g. reserve 1st 8 bytes for calibration values. It may be convenient to group all ATE changeable parameters into a block, e.g. calibration, date_manufacture, product_number
A 16 bit, simple byte-additive checksum will be applied to the config part of the data to ensure integrity.

| | SD1 Operation (Re FIG. 3) | | | |
|---|---|---|---|---|
| Function | What to do | When | Special conditions | Indicator states |
| CHARGE BATTERY | See separate table | See separate table | see separate table | see separate table |
| EMERGENCY | Turn load on (Exits - start inverter - PA5, Units - turn on PA5 full) - see "inverter operation" Decrement charge_level: Discharge_ratio * mins * ((voltage [I_load] – voltage [v_batt]) / sense_res) Increment mins_total_discharge | IF V_input < V_brownout AND V_Batt > V_LVD Keep going until V_LVD | Ignore batt_cap value here. DO NOT indicate LVD or lack of charge as an error condition, even if it happens after a few secs. Brownout operation is required for functional test on ATE and mech assy. Perform LVD actions below, if conditions met. | EMERGENCY |
| LVD | Turn off load (stop inverter - PA5) Zero charge_level Log status | When V_Batt <= V_LVD AND in test mode OR brownout | Monitor V_Batt if discharge started when charge_level >= batt_cap, then log min_battery_runtime, and log count_LVD | SELF_TEST or . . . BATTERY_FAIL |
| MANUAL TEST | Stop charging (turn on PA4) Turn on load (start inverter - PA5) for the duration of Seconds_test_short Check battery voltage Check lamp current Decrement charge_level: Discharge_ratio * mins * ((voltage [I_load] – voltage [v_batt]) / sense_res) Increment mins_total_test, mins_total_discharge and mins_manual_test Store mins_last_test perform ROM and EEPROM checksum | When test button voltage (PB4) < 1V OR remote control message received ($I^2C$) AND charge_level > (batt_cap_short * batt_cap) | Monitor V_Batt if V_Batt < V_LVD, end test, zero charge_level, log stats. monitor I_lamp: if I_Load < I_Load_min, OR (I_load_learnt * 1.1) [if I_load_learnt > 0 and depending on features_enabled] then end test If charge_level < batt_cap_short, then quit During test, the test switch or remote becomes "kill test" | SELF_TEST or . . . BATTERY_FAIL LAMP_FAIL INSUFFI- CIENT_CHARGE (while test switch held) |
| SHORT TEST | Stop charging (turn on PA4) Turn on load (start inverter - PA5) for the duration of Seconds_test_short check battery voltage check lamp current decrement charge_level: discharge_ratio * mins * ((voltage [I_load] – voltage [v_batt]) / sense_res) increment mins_total_test, mins_total_discharge, and mins_short_test store mins_last_test perform ROM and EEPROM checksum | When Time2ShortTest = 0 and not already in test AND charge_level > (batt_cap_short * batt_cap) | Monitor V_Batt if V_Batt < V_LVD, end test, zero charge_level, log stats. monitor I_lamp: if I_Load < I_Load_min, OR (I_load_learnt * 1.1) [if I_load_learnt > 0 and depending on features_enabled] then end test if charge_level < batt_cap_short, the test is held off for hours_reschedule During test, test switch <1V or remote becomes "kill test and hold off for hours_delay" | SELF_TEST or BATTERY_FAIL LAMP_FAIL |
| LONG TEST | As above (replace any occurrencesd of "short" with "long") | When Time2LongTest = 0 and not already in test AND charge_level > (batt_cap_long * batt_cap) | as above (replace any occurrencesd of "short" with "long") | SELF_TEST or . . . BATTERY_FAIL LAMP_FAIL |
| TEST DELAY | Quit test in progress and re-schedule test in hours_delay | If in a SCHEDULED test AND test button pressed OR remote control message received ($I^2C$) | | normal indicator priority |
| CHIRP | 500 ms chirp every 15 mins (like a smoke detector) | When any test failed, until test button pressed (input <1V) OR remote control message received ($I^2C$) - i.e. error cleared (test button acts as a reset, then reverts to being a test button) | all products, depends on features_enabled | |
| CHECK DATA | EEPROM data integrity verified against the byte additive checksum Check EPROM checksum | At power up (except in calibration phase 2) As a part of each test | | ELEC- TRONICS_FAIL |
| CALIBRATE | Read internal temp ref. and dump to log | At power up, dependent on the value of the handshake variable | If out of range (TBD) | ELEC- TRONICS_FAIL |

Battery Charging Algorithms

These battery charging algorithms are a compromise between simplicity and good battery maintenance to enhance capacity and life.

| Function | What to do | When | Special conditions | Indicator states |
|---|---|---|---|---|
| CHARGE BATTERY - FULL CURRENT | Turn off PA3<br>Increment charge_level = mins * ((voltage [I_load] – voltage [v_batt]) / sense_res)<br>If V_batt < V_LVD, then Charge_level = 0<br>If V_batt > V_full, then charge_level = batt_cap | When not in TEST<br>AND V_Input > V_charge<br>AND V_batt <= V_full (full charge threshold)<br>AND charge_level < batt_cap | | if V_Batt > V_OK OR V_Batt < V_low_Batt then BATTERY_FAIL by default, indicate HI_CHARGE |
| CHARGE BATTERY - TRICKLE CURRENT | Turn on PA3<br>This is not assumed to add any charge to the battery. Just maintains charge_level = batt_cap<br>If V_batt < V_LVD, then charge_level = 0 | When not in TEST<br>AND V_Input > V_charge<br>AND V_Batt > V_full<br>OR charge_level >= batt_cap | Note that PA3 being ON has the added benefit of keeping a decent lamp current flowing if the battery has been removed. | if V_Batt > V_OK OR V_Batt < V_low_Batt then BATTERY_FAIL by default, indicate OK |

| Function | What to do | When | Special conditions | Indicator states |
|---|---|---|---|---|
| CHARGE BATTERY - FULL CURRENT | PWM cycle at ??Hz regulate V_batt to V_full * temp_comp * V_tcomp_diode<br>Increment charge_level = mins * ((voltage [I_load] – voltage [v_batt]) / sense_res)<br>If V_batt < V_LVD, then charge_level = 0 | When not in TEST<br>AND V_Input > V_charge<br>AND ((voltage [I_load] – voltage [v_batt]) / sense_res) > I_trickle<br>AND charge_level < batt_cap | | as NiCad |
| CHARGE BATTERY - TRICKLE CURRENT | PWM cycle at ??Hz regulate to V_batt to V_trickle * temp_comp * V_tcomp_diode<br>This is not assumed to add any charge to the battery. Just maintains charge_level = batt_cap<br>If V_batt < V_LVD, then Charge_level = 0 | When not in TEST<br>AND V_Input > V_charge<br>AND ((voltage [I_load] – voltage [v_batt]) / sense_res) < I_trickle<br>OR charge_level >= batt_cap | Cycle back to full current if the current rises above I_trickle (indicates battery discharging), and reset charge_level to batt_cap<br>Note: hysteresis needed here to prevent fast cycling | as NiCad |

Inverter Operation

The inverter uses several variables to define its operation. The idea is to optimize the battery discharge to ensure that the UL requirement (of having 60% of initial (@1 minute) brightness at 90 minutes) is met with the smallest and therefore lowest cost battery.

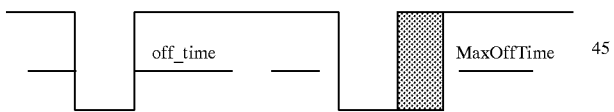

The software will increase the off_time every Off-TimeIncDelay minutes, until MaxOffTime has been reached, and the Offtime will remain at that value until the end of inverter operation (end of test or LVD). These values will be used whenever the inverter is running.

For F/FA/FI options, the off time operation must be adjusted (see next section).

SD2 Operation

SD2 will be configured by features_enabled stored in an EEPROM (different slave address) on the SD2 PCB. The SD2 PCB houses the buzzer too.

Each of the configuration options below act as a mask to modify the features_enabled variable read from the SD2 EEPROM:

| Function | What to do | When | Special conditions | Indicator states |
|---|---|---|---|---|
| FLASHING (F) | Lamp flashes at 1 Hz, 50% duty cycle | EMERGENCY | While running in EMERGENCY, generate off time variables by subtracting F_FA_Fiofftimeadj from off_time and MaxOffTime | EMERGENCY |
| FLASHING/ AUDIBLE (FA) | Lamp flashes at 1 Hz, 50% duty cycle; Audible (PA2) is turned on and off at 1 Hz (on 0.5 seconds, off 0.5 seconds) | EMERGENCY | See FLASHING | EMERGENCY |
| FIRE ALARM INTERFACE (FI) | Lamp flashes at 1 Hz, 50% duty cycle | The test input (PB4) is detected in the range 2.4 to 2.8 V for >300 ms | See FLASHING | See separate table |

Flashing in EMERGENCY can be accomplished by shutting off the boost converter (PA5) to turn off the lamp.

Flashing while charging can be accomplished by clamping the bridge (turning on PA4) to turn off the lamp.

SD "Features_enabled" Variable

SD1 Features_enabled

The features_enabled variable for SD1 is defined as follows. All values are binary.

| Value | Name | What is does |
|---|---|---|
| 00000001 | flashing | Flashes when in brownout |
| 00000010 | load_learn | Enables load learning function |
| 00000100 | remote | Enables remote control features |
| 00001000 | time_delay | Enables time delay of 15 min. |
| 00010000 | audio_enabled | Enables chirp |
| 00100000 | nominal_v_test | Enables check for battery voltage not falling below nominal during first 30 seconds of test |
| 01000000 | | undefined |
| 10000000 | SD_enabled | Enables all SD functions. If this bit is not set, then the LED only indicates charging mode (normal/hi-charge), and the test switch just activates load from the battery (via inverter - or relay if it's a unit) while the test switch is pressed. |

SD2 Features_enabled (EEPROM on SD2 PCB)

The features_enabled variable for SD2 is defined as follows. All values are binary.

| Value | Name | What is does |
|---|---|---|
| 00000001 | flashing | Flashes when in brownout |
| 00000010 | load_learn | Enables load learning function |
| 00000100 | remote | Enables remote control features |
| 00001000 | time_delay | Enables time delay of 15 min. |
| 00010000 | audio_enabled | Enables audible (pulses during brownout only if flashing enabled, chirp enabled) |
| 00100000 | nominal_v_test | Enables check for battery voltage not falling below nominal during first 30 seconds of test |
| 01000000 | fire alarm interface | Enables flashing when fire alarm input is activated if flashing enabled; enables pulsed audible when fire alarm input is activated if audible_enabled is enabled |
| 10000000 | SD_enabled | Enables all SD functions. If this bit is not set, then the LED only indicates charging mode (normal/hi-charge), and the test switch just activates load from the battery (via inverter - or relay if it's a unit) while the test switch is pressed. |

Other variables undefined as yet.

Test Strategy

At ATE test, we need to do the following:

Test the hardware-passive component values and tolerances, and connectivity

Calibrate the hardware

Configure the EEPROM with the required variables

This spec. deals with the software requirements to assist in ATE test

Test Sequence

The ATE sequence will be:

1. Check passive components
2. Hold micro in RESET and power PCB at 83.5% of nominal supply voltage(100V)—the minimum battery charge voltage. The D.C. power supply simulating the nicads is set to the maximum charge voltage V_full— as specified for the particular product being tested.
3. Check the +5V supply voltage to the micro.
4. ATE programs the fixed EEPROM parameters, according to assembly number (by operator). This is a fixed set of data (per product), according to scruct EEPROM_CONFIG
5. ATE programs handshake byte (AA hex) to indicate to micro that it is in phase 1 of ATE test mode.
6. ATE releases RESET and begins monitoring the test switch (test point T11, U2 pin 4) to go low. If the test switch does not go low within TBD milliseconds, the unit under test fails. (tests basic microprocessor operation)

Note: The test switch has an pullup resistor so its value is high during reset, using this pin provides an unambiguous signal to the ATE that calibration mode has been recognized and the current calibration phase has been completed. During normal operation the test switch is an input and will never be driven low by the micro.

During the first phase of test/calibration, while the ATE is waiting for the test switch input to go low, the following sequence of events is occurring:

7. The EEPROM version string is created from the values stored in ROM, allowing the ATE to check ROM version, and determine the expected checksum.
8. If the EEPROM passes the checksum tests and the handshake byte is AA hex, the micro will begin the calibration sequence. If the checksum test fails or handshake value is anything other than AA or BB or 55 Hex, the micro will indicate ELECTRONICS_FAIL. and will not ever set the test switch low.
9. The micro will calculate the value of its internal ROM checksum, and write it to the ROM_checksum variable in EEPROM.
10. The micro writes temp_ref_read value read from internal temp diode to EEPROM.
11. The micro measures V_charge and stores the A/D reading in EEPROM. The value of V_full (=V_charge at this time) already programmed in the EEPROM is used to calculate and store DC_scale.
12. The micro updates the EEPROM checksum, and drives the test switch input low to indicate it has completed this phase of the calibration sequence.

The ATE has now detected the switch input as low, so phase 1 of the procedure is complete. The ATE now has to put the micro into RESET and reads the EEPROM, taking actions based on their contents.

1. When the ATE detects a low on the test switch it applies RESET to the micro, changes the A.C. input voltage to V_brownout.
2. The ATE reads the value of the ROM_checksum variable, and compares it with the published ROM checksum for that software version. A mismatch indicates a test failure.
3. The ATE reads temp_ref_read value from EEPROM and calculates temp_comp based on it's own readings of temperature.
4. The ATE writes the temp_comp calibration parameter(s) to EEPROM, having calculated the necessary relationship between temp_ref_read, and room temperature. (TBD)
5. The ATE writes a value of BB hex to the EEPROM handshake location to indicate to the micro that it is to perform phase 2 of the cal. process.
6. After the new voltage settings have stabilized the ATE releases RESET and once again waits for the test switch to go low. If the test switch does not go low within TBD milliseconds, the unit under test fails.

The ATE now allows the micro to run, and perform the second phase of calibration.

7. The micro measures and stores V_brownout in the EEPROM.
8. If the calibration values within acceptable limits (TBD), it writes the acknowledge value 55 Hex into the handshake byte in the EEPROM.
9. The micro drives the test switch low, indicating completion of the final calibration phase.
10. The micro recalculates the EEPROM checksum, allowing for the added new variables.
11. When the ATE detects a low on the test switch, it applies RESET to the micro and reads the handshake byte from the EEPROM. The handshake byte value is not 55 Hex then the unit under test fails.
12. The ATE then releases reset and performs functional test as desired.

Final Test

The software will support a final test mode, designed to allow any factory induced failures to be cleared out, and clear down the false charge_level variable necessary to get the product through functional test in final assembly. This function may also be used to clear down demo units or returns from the field. The product must be reconfigured via ATE if further tests need to be run after this procedure.

Shutdown Mode

If the test input (PB4) is detected in the range 1.4 to 1.8V for >300 ms AND it is in emergency mode (the inverter running in the case of exits), then the unit goes into shutdown mode. The process is:

Set the following variables:

| Variable | Set to |
| --- | --- |
| Min_battery_runtime | 255 |
| Charge_level | 0 |
| I_load_learnt | 0 |
| Count_brownouts | 0 |
| Count_LVD | 0 |
| Count_user_test | 0 |
| Count_short_test | 0 |
| Count_long_test | 0 |
| Count_lamp_fail | 0 |
| Count_batt_fail | 0 |
| Mins_running | 0 |
| Mins_hicharge | 0 |
| Mins_total_discharge | 0 |
| Mins_total_LVD | 0 |
| Error_code | 0 |
| Mins_total_test | 0 |
| Mins_last_test | 0 |

Following the resetting of variables, the software will:

Configure the switch input into an output, and drive it high for 1 second to drive the LEDs Switch off the inverter and halt the processor.

LED Exit Functions product_type=1

Load Switching Differences

In LED exits, the load is a switching output, with an off time (low) >=11 μs controlled by the variable off_time and an on-time (high) controlled by the time it takes for an interrupt to occur on the external INT pin.

The software maintains a watchdog on this process to ensure that an interrupt has occurred within 500 ms, as a failure of the current-sense comparator will destroy the inverter transistor. This could be accomplished by timestamping each interrupt. The safe level is LOW.

SD1

Signature Exit Signs

The following are the product-specific values for EEPROM configuration.

Values are in decimal unless otherwise indicated.

| Variable | Type | Value |
| --- | --- | --- |
| Product_name | Config | Signature |
| Product_type | Config | 1 |
| Features_enabled | Config | 00000000 (binary) |
| Batt_type | Config | 1 |
| V_LVD | Config | 2100 |
| V_full | Config | 2950 |
| V_OK | Config | 3200 |
| V_low_batt | Config - EEPROM | 1200 (1 cell) |
| I_load_min | Config - EEPROM | 20 |
| Batt_cap (mAH) | Config - EEPROM | 1000 |
| Discharge_ratio | Config - EEPROM | 15 |
| Sense_res | Config - EEPROM | 10000 |
| off_time | Config - EEPROM | 2 |
| MaxOffTime | Config - EEPROM | 2 |
| OffTimeIncDelay | Config | 0 |
| F_FA_Fiofftimeadj | Config | 0 |

SD2

Signature

The following are the product-specific values for the SD2 EEPROM configuration. Values are in decimal unless otherwise indicated.

| Variable | Type | Value |
| --- | --- | --- |
| Features_enabled | Config | 00000000 (binary) |

LED States

The software will generate LED states as defined in the table below

All error indications are cleared by pressing the test button (or remote input). Error conditions will be held through power fail, and continue to be indicated at next power up. More severe errors (as defined by the priority level below) will be shown in preference to less severe ones.

The priority number in the table below indicates which error should be shown in preference to others. Priority 1 is highest.

| Priority | Indicator state | Type | Mnemonic | Means |
| --- | --- | --- | --- | --- |
| 1 | RED flashing | Triple pulse: 125 ms on, 125 ms off, 125 ms on, 125 ms off, 125 ms on, 500 ms off | ELECTRONICS_FAIL | General bad electronics indicator - e.g. couldn't go into emergency mode checksum failure, or any faults not specifically covered elsewhere |

-continued

| Priority | Indicator state | Type | Mnemonic | Means |
|---|---|---|---|---|
| 2 | RED flashing | 1:1, 1 Hz | BATTERY_FAIL | Battery has failed in any of it's detected fail modes (e.g. disconnected, didn't last the test duration before LVD etc) |
| 3 | RED flashing | Double pulse: (as above) | LAMP_FAIL | Lamp failed in any of it's detected fail modes (e.g. disconnected, out of tolerance etc) |
| 4 | GREEN flashing | 1:1, 1 Hz | SELF_TEST | Product is doing a self test (of any type) |
| 5 | OFF | | EMERGENCY | Product is in emergency mode |

-continued

| Priority | Indicator state | Type | Mnemonic | Means |
|---|---|---|---|---|
| 5 | RED/GREEN flashing - only when test button pressed or external command | single pulse 1:1, 1 Hz | INSUFFICIENT_CHARGE | There is insufficient energy in the battery to do the requested test |
| 6 | RED | ON | HI_CHARGE | Hi-charge mode (i.e. it's charging at anything other than trickle) |
| 7 | GREEN | ON | OK (normal) | Product OK (normal indication of charge) |

TABLE II

Variables

| Variable | Type | Description | Range of values | size | units | default |
|---|---|---|---|---|---|---|
| Version | Config | Version string | X.XX | 4 char | | 1.00 |
| Date_manufacture | Config | A string containing the manufacturing date | 971101 | 6 char | | |
| Product_name | Config | A string for human recognition only. Probably the assembly number | XXXXXXXXX | 10 char | | product |
| Product_type | Config | Defines product type. This variable also determines pin usage on the micro | 1 = EXIT with inverter  2 = unit-VRLA  3 = unit-NiCd  4 = inverter | 8 | | product |
| Features_enabled | Config | Defines enabled features. Combined with SD2 switch settings as a mask to determine exact product functionality | see separate table | 8 | | product |
| V_LVD | Config | Low voltage disconnect voltage. This is the voltage at which the lamp load must be disconnected from the battery to prevent "deep discharge" damage. The load must always be disconnected at this voltage, regardless of other requirements. | | 16 | millivolts | product |
| V_full | Config | Full charge voltage @ 20 degrees C. This is the max. battery voltage allowed for full current charging. If the product is lead-acid, this is the voltage that the output is regulated to in full-charge mode (i.e. this is the voltage setpoint to turn charger off). External current limiting may reduce the achievable voltage below this level. | | 16 | millivolts | product |
| V_OK | Config | Charger OK voltage (upper limit). This is the max. allowable charger voltage. If a voltage is measured above this, then the charger is assumed to have been damaged. Indicate ELECTRONICS_FAIL. | | 16 | millivolts | product |
| V_low_batt | Config | Battery low voltage (lower limit). This is the min. allowable battery voltage. If a voltage is measured lower than this, then a cell is assumed to have gone short circuit, or is otherwise damaged. Indicate BATTERY_FAIL. | | 16 | millivolts | product |
| V_trickle | Config | Lead-acid only. Trickle charge voltage (i.e. - this is the voltage level that you turn charger on at) @ 20 degrees C. | | 16 | millivolts | product |
| I_trickle | Config | Lead-acid only. Trickle charge current (current threshold used in conjunction with the charge gauge to decide when the battery is fully charged). | | 16 | mA | product |
| V_brownout | Config | The mains voltage level below which we go into emergency mode | | 16 | Raw A/D reading | Cal |
| V_charge | Config | The mains voltage level above which we go back into charger mode | | 16 | Raw A/D reading | Cal |
| sense_res | Config | The value of the sense resistor in milliohms | | 8 | Ohms | Product |
| batt_cap | Config | Defines the one half of the total battery capacity (used ½ of total capacity to conserve space in the EEPROM). | | 16 | mA hours | Product |
| Frequency_test_short | Config | Defines how often the short test is run | | 16 | hours | 720 |
| Mins_test_short | Config | Factory configured time for short self-test | | 8 | mins | 5 |

TABLE II-continued

Variables

| Variable | Type | Description | Range of values | size | units | default |
|---|---|---|---|---|---|---|
| Seconds_test_man | Config | time for manual test (button / remote input) | | 8 | secs | 30 |
| Frequency_test_long | Config | Defines how often the long test is run | | 16 | hours | 4320 |
| Mins_test_long | Config | Factory configured time for long self-test | | 8 | mins | 30 |
| Hours_reschedule | Config | The time to offset a test if the battery is not fully charged | | 8 | hours | 24 |
| Hours_delay | Config | The time to offset a test if the user presses the test button (or remote) during a (successful) scheduled test | | 8 | hours | 8 |
| Batt_cap_short | Config | Defines the min. batt % for the short test or manual test to be run. If < this %, a short test is delayed by hours_reschedule, manual test is aborted. | | 8 | % | 70 |
| Batt_cap_long | Config | Defines the min. batt % for the long test to be run - otherwise it is delayed by hours_reschedule | | 8 | % | 90 |
| Lamp_on_time | Config | Defines the amount of time to leave the lamps on after power is restored following a brownout. Used to provide time-delay feature for unit equipment. | | 8 | mins | 0 |
| DC_scale | Config | The scale factor generated as a result of calibration is used to calculate the expected diode voltage when reading the temperature diode. V_TempDiode = (a2d_delay * DC_scale) / 65536. | | 16 | Raw A/D reading | 0 |
| Time2ShortTest | Nonvol | The number of hours until start of the next short test | | 16 | Hours | 30 |
| Time2LongTest | Nonvol | The number of hours until start of the next long test | | 16 | Hours | 168 |
| Mins_batt_fail | Config | If a discharge starts with a fully charged battery and then drops below V_lvd before this amount of time has elapsed then we count a failure.} | | 8 | Mins | 60 |
| Handshake | Config, on ATE | A location for the ATE and the micro to write their status byte to perform handshaking during calibration | | 8 | | 0 |
| VdeltaC | Config | Number of millivolts/degree C. * 5 to reduce V_full and V_trickle if the temperature is above 20 degrees C. Also the number used to increase V_full and V_trickle if the temperature is below 20 degrees C. | | 8 | Millivolts * 5 | 3.8 mV / cell |
| TempVZero | Config | Nominal temperature diode voltage in millivolts at 0 degrees C. | | 16 | Millivolts | 747 |
| TempDeltaV | Config | Nominal temperature diode slope in millivolts / degree C. * 10 | | 8 | Millivolts * 10 | 16 |
| AC_adjust | Config | Value to be added to V_brownout when charging to compensate for transformer I2R losses. | | 8 | Raw value | Product |
| BatV_scale | Config | Raw A/D reading of pin 2 taken by A/D during calibration. It will be used to calculate a calibration factor for measuring battery voltage. V_Batt = (a2d_delay * BatV_scale) / 65536 | | 16 | Raw A/D reading | Cal |
| I_charge_Factor | Config | Scaling factor to calibrate current measurements while charging | | 16 | Raw A/D reading | Cal |
| I_discharge_factor | Config | Scaling factor to calibrate current measurement while discharging | | 16 | Raw A/D reading | Cal |
| Min_battery_runtime | Log | The minimum number of minutes that the unit has run in test or emergency mode to LVD since day 0. Only updated if the battery was fully charged at start of discharge | | 8 | Mins | 255 |
| Charge_level | Nonvol | Estimate of the current battery charge level | | 32 | mA mins | 0 |
| I_load_min | Nonvol | Minimum discharge current calculated during the load learn cycle. Current is calculated by multiplying the total measured current by the min_load_percent variable. If the measured discharge current drops below this value, indicate LAMP_FAIL | | 16 | mA | 0 |
| Min_load_percent | Config | Minimum percentage of learned lamp current before LAMP_FAIL is declared. | | 8 | % | 80 |
| Count_brownouts | Log | Number of power failures | | 16 | events | 0 |
| Count_LVD | Log | Number of times went into LVD, from a fully charged state | | 16 | events | 0 |
| Count_user_test | Log | Number of times user has pressed test button or remote | | 16 | events | 0 |
| Count_short_test | Log | Number of times short test has run | | 16 | events | 0 |
| Count_long_test | Log | Number of times long test has run | | 16 | Events | 0 |
| Count_lamp_fail | Log | Number of times a lamp has failed | | 16 | Events | 0 |
| Count_batt_fail | Log | Number of times a battery has failed | | 16 | Events | 0 |
| Mins_running | Log | Total time product has been running since day 0. | | 24 | Mins | 0 |
| Mins_hicharge | Log | Total time product has been charging at full since day 0 | | 24 | Mins | 0 |
| Mins_tricklecharge | Log | Total time product has been charging at trickle since day 0 | | 24 | Mins | 0 |
| Mins_total_discharge | Log | Total time product has been in discharge since day 0 | | 24 | Mins | 0 |
| Mins_Total_LVD | Log | Total of the minutes running in discharge, when the discharge ended in LVD, and started from a fully charged state. Used with "Count_LVD" to determine average time to LVD over product life. | | 24 | Mins | 0 |
| Error_code | Log | Log of the last error. 8 bit error code is a number representing the mnemonics listed in "LED states" with any additional data relevant to the failure in the other 8 bits<br>0 No error (ever)<br>1 V_LVD detected during test<br>2 V_LVD detected during brownout<br>3 V_LVD detected during normal operation<br>4 Battery V_OK check failed | | 8 | error code | 0 |

TABLE II-continued

Variables

| Variable | Type | Description | Range of values | size | units | default |
|---|---|---|---|---|---|---|
| | | 5 Battery V_low_batt check failed<br>6 Lamp current check failed<br>7 EEPROM checksum incorrect<br>8 Not used<br>9 Invalid handshake byte in EEPROM<br>10 Micro Code checksum incorrect<br>11 Battery below nominal during first 30 secs of test) | | | | |
| ErrFlags | Nonvol | Bit map indicating current failures which have not be cleared by the user:<br>00000001 = ElectronicsFail<br>00000002 = BatteryFail<br>00000004 = LampFail | | 8 | Bit map | 0 |
| Mins_total_test | Log | Total time product has been in test since day 0 | | 24 | Mins | 0 |
| Mins_last_test | Log | The timestamp of the last test - copy of Mins_running at the time of the last test | | 24 | Mins | 0 |
| Temp_ref_read | Log | Set to the current temperature by the ATE during calibration. During normal operation it is the measured temperature at the time the EEPROM was last updated | | 16 | Deg C. | Cal |
| ROM_checksum | Log | Calculated during calibration, so ATE can compare with the published value | | 16 | raw value | 0 |
| Ibatt | Log | Calculated value of measured current | | 16 | MA | 0 |

Note:
calibration values should be stored in a fixed area at the start of EEPROM so that the product configuration can be changed later without changing the ATE calibration. E.g. reserve 1st 8 bytes for calibration values. It may be convenient to group all ATE changeable parameters into a block, e.g. calibration, date_manufacture, product_number
4 byte in EEPROM available
Log Bytes = 40, Config Bytes = 53, Non_Vol = 11, Other Bytes = 20
A 16 bit, simple byte-additive checksum will be applied to the config part of the data to ensure integrity.

SDI Operation (Re FIG. 5)

| Function | What to do | When | Special conditions | Indicator states |
|---|---|---|---|---|
| CHARGE BATTERY | See separate table | See separate table | see separate table | see separate table |
| EMERGENCY | Turn load on (Units - turn on PA5 full)<br>Decrement charge_level: mins * I_discharge<br>Increment mins_total_discharge | IF V_Input < V_brownout AND V_Batt > V_LVD<br>Keep going until V_LVD | Ignore batt_cap value here.<br>DO NOT indicate LVD or lack of charge as an error condition, even if it happens after a few secs. Brownout operation is required for functional test on ATE and mech assy.<br>Perform LVD actions below, if conditions met. | EMERGENCY |
| LVD | Turn off load<br>Zero charge_level<br>Log status | When V_Batt <= V_LVD AND in test mode OR brownout | Monitor V_Batt<br>If discharge started when charge_level >= full, then log min_battery_runtime, and log count_LVD | EMERGENCY |
| TIME DELAY | Stop charging (PA4 on "high")<br>Turn on load (PA5 on "high") for the duration of Seconds_test_man<br>Check battery voltage<br>Check lamp current<br>Decrement charge_level: mins * I_discharge | When AC power is restored after a brownout. | Time delay operation of DC lamps, set by lamp_on_time variable can be canceled at any time during the time delay by pressing the test switch. | STEADY GREEN |
| MANUAL TEST | Stop charging (PA4 on "high")<br>Turn on load (PA5 on "high") for the duration of Seconds_test_man<br>Check battery voltage<br>Check lamp current<br>Decrement charge_level: mins * I_discharge<br>Increment mins_total_test, mins_total_discharge and mins_manual_test<br>Store mins_last_test<br>perform ROM and EEPROM checksum | When test button voltage (PB4) < 1 V<br>OR remote control message received (I²C)<br>AND charge_level > (batt_cap_short * batt_cap) | Monitor V_Batt<br>if V_Batt < V_LVD, end test, zero charge_level, log stats.<br>monitor I_lamp:<br>if I_Load < I_Load_min, and depending on features_enabled] then end test<br>If charge_level < batt_cap_short, then quit<br>During test, the test switch or remote becomes "kill test" | SELF_TEST or . . .<br>BATTERY_FAIL<br>LAMP_FAIL<br>INSUFFI-CIENT_CHARGE (while test switch held) |

SDI Operation (Re FIG. 5)

| Function | What to do | When | Special conditions | Indicator states |
|---|---|---|---|---|
| SHORT TEST | Stop charging (PA4 on "high") Turn on load (PA5 on "high") for the duration of Seconds_test_short check battery voltage check lamp current Decrement charge_level: mins * I_discharge increment mins_total_test, mins_total_discharge, and mins_short_test store mins_last_test perform ROM and EEPROM checksum | When Time2ShortTest = 0 and not already in test AND charge_level > (batt_cap_short * batt_cap) | Monitor V_Batt if V_Batt < V_LVD, end test, zero charge_level, log stats. monitor I_lamp: if I_Load < I_Load_min, and depending on features_enabled] then end test If charge_level < batt_cap_short, the test is held off for hours_reschedule During test, test switch <1 V or remote becomes "kill test and hold off for hours_delay" | SELF_TEST or . . . BATTERY_FAIL LAMP_FAIL |
| LONG TEST | As above (replace any occurrences of "short" with "long") | When Time2LongTest = 0 and not already in test AND charge_level > (batt_cap_long * batt_cap) | as above (replace any occurrences of "short" with "long") | SELF_TEST or . . . BATTERY_FAIL LAMP_FAIL |
| TEST DELAY | Quit test in progress and re-schedule test in hours_delay | If in a SCHEDULED test AND test button pressed OR remote control message received ($I^2C$) | | normal indicator priority |
| CHIRP | 500 ms chirp every 15 mins (like a smoke detector) | When any test failed, until test button pressed (input <1 V) OR remote control message received ($I^2C$) - i.e. error cleared (test button acts as a reset, then reverts to being a test button) | all products, depends on features_enabled | |
| CHECK DATA | EEPROM data integrity verified against the byte additive checksum Check EPROM checksum | At power up (except in calibration phase 2) As a part of each test | | ELECTRONICS_FAIL |
| CALIBRATE | Read internal temp ref. and dump to log | At power up, dependent on the value of the handshake variable | If out of range (TBD) | ELECTRONICS_FAIL |

Battery Charging Algorithms

These battery charging algorithms are a compromise between simplicity and good battery maintenance to enhance capacity and life.

| Function | What to do | When | Special conditions | Indicator states |
|---|---|---|---|---|
| CHARGE BATTERY - FULL CURRENT | Turn off PA3 Increment charge_level = mins * ((voltage [I_load] - voltage [v_batt]) / sense_res) If V_batt < V_LVD, then Charge_level = 0 If V_batt > V_full, then charge_level = batt_cap | When not in TEST AND V_Input > V_charge AND V_batt <= V_full (full charge threshold) AND charge_level < batt_cap | | if V_Batt > V_OK OR V_Batt < V_low_Batt then BATTERY_FAIL by default, indicate HI_CHARGE |
| CHARGE BATTERY - TRICKLE CURRENT | Turn on PA3 This is not assumed to add any charge to the battery. Just maintains charge_level = batt_cap If V_batt < V_LVD, then charge_level = 0 | When not in TEST AND V_Input > V_charge AND V_Batt > V_full OR charge_level >= batt_cap | Note that PA3 being ON has the added benefit of keeping a decent lamp current flowing if the battery has been removed. | if V_Batt > V_OK OR V_Batt < V_low_Batt then BATTERY_FAIL by default, indicate OK |

Lead Acid (This description assumes starting with a fully discharged battery)

| Function | What to do | When | Special conditions | Indicator states |
|---|---|---|---|---|
| CHARGE BATTERY - FULL CURRENT | Regulate V_batt to V_full ± VDeltaC Increment charge_level = mins * I_batt If V_batt < V_LVD, then charge_level = 0 | When not in TEST AND V_Input > V_charge Wait for Charge_level = full before going to trickle charge OR after 168 hrs of continuous high charge: | Regulate charge voltage at V_full until Charge_level = full. | as NiCad |

-continued

| Function | What to do | When | Special conditions | Indicator states |
|---|---|---|---|---|
| CHARGE BATTERY - TRICKLE CURRENT | Regulate V_batt to V_trickle ± VDeltaC This is not assumed to add any charge to the battery. Just maintains charge_level = batt_cap If V_batt < V_LVD, then Charge_level = 0 | When not in TEST AND V_Input > V_charge AND V_batt <= V_trickle AND I_charge < I_trickle | Cycle back to full charge voltage levels if the current rises above I_trickle (indicates battery discharging), and reduce charge_level by 10% | as NiCad |

SD2 Operation

The hardware of SD2 can include a simple I²C port or another microdevice that decodes radio data received, reads a set of config switches and the Fire Alarm input. The SD2 PCB houses the buzzer too. Either solution is assumed to involved the main micro reading the slave in a master-read mode, as if it were reading an EEPROM at a different address.

Each of the configuration options below act as a mask to modify the features_enabled variable read from EEPROM. If no SD2 board is detected at power-up, the mask is set to FF Hex so that any features programmed on the ATE are automatically enabled.

The following functions are so far defined for SD2 hardware and software:

Configuration of "long" test duration, by DIP switches or other method. An appropriate I²C message is sent from the daughter board Enable/disable buzzer by DIP switches or other method An appropriate I²C message is sent from the daughter board An additional feature is the reception of serial radio data, passing it to the main processor. This may or may not be decoded by the SD2 board, depending on feasibility. If decoded by the SD2 hardware, then it will pass a simple I²C message to the main processor.

SD "features_enabled" Variable

The features_enabled variable is defined as follows. All values are binary

| Value | Name | What is does |
|---|---|---|
| 00000001 | Unused | |
| 00000010 | Unused | |
| 00000100 | Remote | Enables remote control features |
| 00001000 | Unused | |
| 00010000 | audio_enabled | Enables chirp |
| 00100000 | Nominal_v_test | Enables the UL Nominal voltage test during the first 30 seconds of a test |
| 01000000 | Power_on_delay | **Test only? ? ? Do we use this for the 5 second delay in calibration? |
| 10000000 | SD_enabled | Enables all SD functions. If this bit is not set, then the LED only indicates charging mode (normal/hi-charge), and the test switch just activates load from the battery (via inverter - or relay if it's a unit) while the test switch is pressed. |

Other variables undefined as yet.

TEST Strategy

At ATE test, we need to do the following:
Test the hardware-passive component values and tolerances, and connectivity
Calibrate the hardware
Configure the EEPROM with the required variables This spec. deals with the software requirements to assist in ATE test Test Sequence The ATE sequence will be:

1. Check passive components
2. Hold micro in RESET and power PCB at 83.5% of nominal supply voltage(100V)—the minimum battery charge voltage. The D.C. power supply simulating the battery is set to the maximum charge voltage V_full— as specified for the particular product being tested. A separate DC power supply draws 4.5 amps of current through the current sense resistor to create a negative voltage drop simulating a charge current.
3. Check the +5V supply voltage to the micro.
4. ATE programs the fixed EEPROM parameters, according to assembly number (by operator). This is a fixed set of data (per product), according to struct EEPROM_CONFIG
5. ATE programs temp_ref_read EEPROM variable with the current ambient temperature in degrees C. Micro will use this value to calibrate the temperature reading.
6. ATE programs handshake byte (AA hex) to indicate to micro that it is in phase 1 of ATE test mode.
7. ATE releases RESET and begins monitoring the test switch (test point T12, U6 pin 4) to go low. If the test switch does not go low within 3 seconds, the unit under test fails. (tests basic microprocessor operation)

Note: The test switch has an pullup resistor so its value is high during reset, using this pin provides an unambiguous signal to the ATE that calibration mode has been recognized and the current calibration phase has been completed. During normal operation the test switch is an input and will never be driven low by the micro.

During the first phase of test/calibration, while the ATE is waiting for the test switch input to go low, the following sequence of events is occurring:

8. If the EEPROM passes the checksum tests and the handshake byte is AA hex, the micro will begin the calibration sequence. If the checksum test fails or handshake value is anything other than AA or BB or 55 Hex, the micro will indicate ELECTRONICS_FAIL, and will not ever set the test switch low.
9. The EEPROM version string is created from the values stored in ROM, allowing the ATE to check ROM version, and determine the expected checksum. The micro will calculate the value of its internal ROM checksum, and write it to the ROM_checksum variable in EEPROM.
10. The micro measures V_charge and stores the A/D reading in EEPROM. The value of V_full (=V_charge at this time) already programmed in the EEPROM is used to calculate and store DC_scale.
11. The micro measures voltage I_load and calculates and stores I_discharge_factor.

12. The micro measures the voltage on U6 pin 2 and uses this value to calculate and store a calibration factor for battery measurement BatV_scale.
13. The micro updates the EEPROM checksum, and drives the test switch input low to indicate it has completed this phase of the calibration sequence.

The ATE has now detected the switch input as low, so phase 1 of the procedure is complete. The ATE now has to put the micro into RESET and reads the EEPROM, taking actions based on their contents.

1. When the ATE detects a low on the test switch it applies RESET to the micro, changes the A.C. input voltage to V_brownout.
2. The ATE reads the value of the ROM_checksum variable, and compares it with the published ROM checksum for that software version. A mismatch indicates a test failure.
3. The ATE writes a value of BB hex to the EEPROM handshake location to indicate to the micro that it is to perform phase 2 of the cal. process.
4. The ATE draws 1 amp of current through the current sense resistor to create a positive voltage drop.
5. After the new voltage settings have stabilized the ATE releases RESET and once again waits for the test switch to go low. If the test switch does not go low within TBD milliseconds, the unit under test fails.

The ATE now allows the micro to run, and perform the second phase of calibration.

6. The micro measures and stores V_brownout in the EEPROM.
7. The micro measures voltage I_load and calculates and stores I_charge_factor.
8. If the calibration values within acceptable limits (checked against values in the ATE program), it writes the acknowledge value 55 Hex into the handshake byte in the EEPROM.
9. The micro recalculates the EEPROM checksum, allowing for the added new variables.
10. The micro drives the test switch low, indicating completion of the final calibration phase.
11. When the ATE detects a low on the test switch, it applies RESET to the micro and reads the handshake byte from the EEPROM. The handshake byte value is not 55 Hex then the unit under test fails.
12. The ATE then releases reset and performs functional test as desired.

Final Test

The software will support a final test mode, designed to allow any factory induced failures to be cleared out, and clear down the false charge_level variable necessary to get the product through functional test in final assembly. This function may also be used to clear down demo units or returns from the field. The product must be reconfigured via ATE if further tests need to be run after this procedure.

Shutdown Mode

If the test input (PB4) is detected in the range 1.4 to 1.8V for >300 ms AND it is in emergency mode (the inverter running in the case of exits), then the unit goes into shutdown mode. The process is:

Set the following variables:

| Variable | Set to |
| --- | --- |
| Min_battery_runtime | 255 |
| Charge_level | 100% |
| I_load_min | 0 |
| Count_brownouts | 0 |
| Count_LVD | 0 |
| Count_user_test | 0 |
| Count_short_test | 0 |
| Count_long_test | 0 |
| Count_lamp_fail | 0 |
| Count_batt_fail | 0 |
| Mins_running | 0 |
| Mins_hicharge | 0 |
| Mins_total_discharge | 0 |
| Mins_total_LVD | 0 |
| Error_code | 0 |
| Mins_total_test | 0 |
| Mins_last_test | 0 |

Following the resetting of variables, the software will:
Configure the switch input into an output, and drive it high for 1 second to drive the LEDs
Halt the processor.

Unit Functions
product_type—emergency unit equipment

Load Switching
Lamp drive is constant, high=on

Charger
PA4 is used to control a transistor tied to the adjust pin of a voltage regulator. Making PA4 high turns on the transistor which pulls the adjust pin low turning off the charge current to the battery. The PA4 pin is also used to turn the charger off during manual and self test modes.

SD1
Time delay: Keeps lamps on for lamp_on_time mins. after power is restored.
Load learn: This feature enables the unit to determine the total amount of lamp current drawn by the unit. The unit takes the result of the load learn cycle and multiplies it by the min_load_percent variable storing the result in the variable I_load_min. The load learn cycle is initiated automatically during the first scheduled self test. The load learn cycle can also be initiated manually by pressing and holding the test switch for 15 seconds. This starts a test cycle that is terminated after 15 seconds, to give the user feedback that the load learn cycle is complete.

SD1
6V, 16W
The following are the product-specific values for EEPROM configuration.
Values are in decimal unless otherwise indicated.
These values will vary according to unit DC voltage and wattage levels.

| Variable | Type | Value |
| --- | --- | --- |
| Product_name | Config | 6 V, 16 W |
| Product_type | Config | 2 |
| Features_enabled | Config | 11011111 (binary) |
| Batt_type | Config | 2 |
| V_LVD | Config | 5250 |
| V_full | Config | 7200 |
| V_trickle | Config | 6900 |
| I_trickle | Config | 50 |
| V_OK | Config | 8000 |

| Variable | Type | Value |
|---|---|---|
| V_low_batt | Config | 4000 (2 cell) |
| I_load_min | Config | 0 |
| Batt_cap (mAH) | Config | 6500 |
| VdeltaC | Config | 114 |
| TempVZero | Config | 747 |
| TempDeltaV | Config | 16 |

12V, 50W

The following are the product-specific values for EEPROM configuration.

Values are in decimal unless otherwise indicated.

| Variable | Type | Value |
|---|---|---|
| Product_name | Config | 12 V, 50 W |
| Product_type | Config | 2 |
| Features_enabled | Config | 11011111 (binary) |
| Batt_type | Config | 2 |
| V_LVD | Config | 10500 |
| V_full | Config | 14400 |
| V_trickle | Config | 13800 |
| I_trickle | Config | 50 |
| V_OK | Config | 15500 |
| V_low_batt | Config | 9000 (4.5 cell) |
| I_load_min | Config | 0 |
| Batt_cap (mAH) | Config | 10000 |
| VDeltaC | Config | 228 |
| TempVZero | Config | 747 |
| TempDeltaV | Config | 16 |

SD2

Voltmeter and Ammeter functions via I²C—report measured charge current and voltage to bargraph LED meters.

LED States

The software will generate LED states as defined in the table below.

All error indications are cleared by pressing the test button (or remote input). Error conditions will be held through power fail, and continue to be indicated at next power up. More severe errors (as defined by the priority level below) will be shown in preference to less severe ones.

The priority number in the table below indicates which error should be shown in preference to others. Priority 1 is highest.

| Priority | Indicator state | Type | Mnemonic | Means |
|---|---|---|---|---|
| 1 | RED flashing | Triple pulse: 125 ms on, 125 ms off, 125 ms on, 125 ms off, 125 ms on, 500 ms off | ELEC- TRONICS_ FAIL | General bad electronics indicator - e.g. couldn't go into emergency mode checksum failure, or any faults not specifically covered elsewhere |
| 2 | RED flashing | 1:1, 1 Hz | BATTERY_ FAIL | Battery has failed in any of it's detected fail modes (e.g. disconnected, didn't last the test duration before LVD etc) |
| 3 | RED flashing | Double pulse: (as above) | LAMP_ FAIL | Lamp failed in any of it's detected fail modes (e.g. disconnected, out of tolerance etc) |
| 4 | GREEN flashing | 1:1, 1 Hz | SELF_ TEST | Product is doing a self test (of any type) |
| 5 | OFF | | EMER- GENCY | Product is in emergency mode |
| 5 | RED/ GREEN flashing - only when test button pressed or external command | single pulse 1:1, 1 Hz | INSUFFI- CIENT_ CHARGE | There is insufficient energy in the battery to do the requested test |
| 6 | RED | ON | HI_ CHARGE | Hi-charge mode (i.e. it's charging at anything other than trickle) |
| 7 | GREEN | ON | OK (normal) | Product OK (normal indication of charge) |

While the invention has been described expressly relative to the particular emergency lighting system shown in the drawings and detailed in the present specification, it is to be understood that the invention can be configured other than expressly illustrated without departing from the scope of the invention, the scope of the invention being dictated by the recitations of the appended claims.

What is claimed is:

1. In an emergency lighting system operable in an emergency mode to energize at least one emergency lamp from emergency power provided by a battery on sensing of an emergency condition such as utility power failure, the lighting system having a boost converter circuit, the lighting system further having a diagnostic system capable of performing self-diagnostic and/or self-test functions indicative of the operational state of the emergency lighting system, the diagnostic system including at least one microprocessor, the improvement comprising:

means for monitoring current in the boost converter circuit; and, means for controlling the rate of battery drain current in response to current values in the boost converter circuit received from the boost converter current monitoring means, the battery drain current controlling means comprising, a boost switch in the boost converter circuit and, means for generating a reference voltage in response to boost converter current to provide a feedback signal to the microprocessor when current sensed by the boost converter current monitoring means reaches a predetermined level of a voltage greater than the reference voltage, the microprocessor acting to change the status of the boost switch to cause energy in the boost converter circuit to be delivered to the lamp to complete a switching cycle of the boost switch.

2. In the emergency lighting system of claim 1 wherein the boost switch comprises a transistor having a base, the microprocessor turning the base to an off condition to cause energy in the boost converter circuit to be delivered to the lamp.

3. In the emergency lighting system of claim 2 wherein the boost converter circuit further comprises a pair of inductors and a diode.

4. In the emergency lighting system of claim 2 wherein the boost converter circuit comprises at least one inductor that holds the energy which is to be delivered to the lamp.

5. In the emergency lighting system of claim 1 wherein the boost converter current monitoring means comprises a resistor.

6. In the emergency lighting system of claim 1 wherein the reference voltage generating means comprises an operational amplifier.

7. In the emergency lighting system of claim 1 wherein the microprocessor has an interrupt pin, the feedback signal being provided to the interrupt pin.

8. In the emergency lighting system of claim 1 wherein the improvement further comprises:

means for adjusting the switching cycle of the boost switch to control the time of operation of the boost switch in order to permit operation of the switching cycle of the switch.

9. In the emergency lighting system of claim 8 wherein the boost switch comprises a transistor and the reference voltage generating means comprises an operational amplifier.

10. In the emergency lighting system of claim 1 wherein the improvement further comprises:

means for changing battery drain rate by controlling the time of operation of the boost switch in order to adjust the switching cycle of the switch and thus permit alteration of the switching cycle of the switch.

11. In the emergency lighting system of claim 1 wherein the battery drain current rate controlling means comprises:

means for providing a current path between the battery and the boost switch through the boost converter circuit on placement of a high feedback signal on the boost switch to turn the switch to an on condition, said high signal indicating the existence of a voltage across the boost converter current monitoring means that is greater than or equal to a reference voltage generated by the reference voltage generating means, the microprocessor thus initiating a switching sequence on the boost converter circuit through placement of the high feedback signal on the boost switch.

12. In the emergency lighting system of claim 1 wherein the improvement further comprises:

means for self-calibration of the diagnostic system on initial operation of the diagnostic system causing exposure of the diagnostic system to an unknown load characteristic of the lighting system, a loading value particular to the lighting system being provided to the microprocessor.

13. In the emergency lighting system of claim 1 wherein the lighting system includes an inverter and the boost converter circuit comprises a first inductor and a second inductor, the inverter providing power to the microprocessor when the lighting system is operating in emergency mode, the first inductor providing a relatively higher voltage to the lamp and the second inductor providing a relatively lower voltage to the microprocessor.

14. In the emergency lighting system of claim 13 wherein the diagnostic system further comprises:

regulator means receiving a lower voltage input from the second inductor for generating a precise voltage that is provided to the microprocessor.

15. In the emergency lighting system of claim 1 wherein the boost converter circuit comprises two inductors, the diagnostic system further comprising:

regulator means for generating a precise voltage to the microprocessor; and, means for supplying a predetermined voltage to the regulator means, the regulator means supplying through the inductors a peak current of a fixed value regardless of inductor value or load, thereby regulating current to the lamp to provide a more consistent light output.

16. In the emergency lighting system of claim 1 wherein the lighting system includes an inverter, the improvement further comprising:

a regulator located in the diagnostic system between the battery and the microprocessor for supplying voltage of a predetermined level to the microprocessor during emergency mode operation; and, means disposed in a current path between the battery and the regulator for blocking the current path to prevent current flow to the regulator in the event of the existence of voltage across said blocking means of less than a predetermined value, current flow through the blocking means being prevented except during operation of the inverter, thus causing a minimum amount of power to be consumed by the lighting system on discontinuation of inverter operation.

17. In the emergency lighting system of claim 16 wherein the blocking means comprises a Zener diode.

18. In the emergency lighting system of claim 16 wherein the current path between the battery and the regulator includes an inductance.

19. In the emergency lighting system of claim 1 wherein the lighting system includes an inverter and the improvement further comprises:

means for storing parameters characteristic of differing lighting systems and for providing the stored parameters to the microprocessor for varying off time of the inverter, the microprocessor determining a desired off time based on the lighting system with which the diagnostic system is operated.

20. In the emergency lighting system of claim 13 wherein the parameter storage means comprises an EEPROM.

21. In the emergency lighting system of claim 20 wherein the EEPROM records an activity log for field return diagnosis to allow a precise evaluation of field returns necessary to quantify operating conditions and to facilitate failure analysis.

22. In the emergency lighting system of claim 20 wherein the EEPROM stores configuration parameters for control of lighting system operation and system configuration.

23. In the emergency lighting system of claim 1 wherein the lighting system includes a current controller operable to control current to the battery during charging of the battery and a circuit for sensing utility power, the microprocessor comprising means for monitoring and controlling operation of the battery charger; means for monitoring and controlling operation of the controller circuit and means for monitoring and controlling operation of the utility power sensing circuit.

24. In the emergency lighting system of claim 1 wherein the lamp comprises an array of light emitting diodes.

25. In the emergency lighting system of claim 1 wherein the battery comprises at least one nickel/cadmium cell.

26. In the emergency lighting system of claim 1 wherein the improvement further comprises an EEPROM and a two-wire serial data interface between the microprocessor and the EEPROM.

27. In the emergency lighting system of claim 1 wherein the lamp comprises a DC incandescent lamp.

28. In an emergency lighting system operable in an emergency mode to energize at least one lamp from emergency power provided by a battery on sensing of discontinuation of utility power to the lighting system and having a diagnostic system capable of performing self-diagnostic and/or self-test functions indicative of the operational state of the emergency lighting system, the diagnostic system including at least one microprocessor and a boost converter having a boost switch, a method for controlling battery drain rate comprising the steps of:

monitoring boost converter current;

generating a reference voltage proportional to boost converter currant;

generating a feedback signal on sensing of a boost converter current sufficient to produce a voltage of a predetermined level greater than the reference voltage;

feeding the feedback signal to the microprocessor; and, altering the status of the boost switch through control by the microprocessor to cause energy in the boost converter circuit to be delivered to the lamp to complete a switching cycle of the boost switch.

* * * * *